US006678788B1

United States Patent
O'Connell

(10) Patent No.: US 6,678,788 B1
(45) Date of Patent: *Jan. 13, 2004

(54) DATA TYPE AND TOPOLOGICAL DATA CATEGORIZATION AND ORDERING FOR A MASS STORAGE SYSTEM

(75) Inventor: Mark Andrew O'Connell, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/579,671

(22) Filed: May 26, 2000

(51) Int. Cl.[7] ............................................. G06F 12/00
(52) U.S. Cl. .................. 711/114; 707/200; 707/201; 707/202; 707/203; 707/204; 707/205; 707/206
(58) Field of Search .................. 707/102, 200–206; 711/114

(56) References Cited

U.S. PATENT DOCUMENTS 6,128,717 A * 10/2000 Harrison et al. ............ 711/202
6,526,406 B1 * 2/2003 Suzuki et al. ................ 707/10

* cited by examiner

Primary Examiner—Donald Sparks
Assistant Examiner—Meldi Namazi
(74) Attorney, Agent, or Firm—Davis and Bujold, P.L.L.C.

(57) ABSTRACT

The storage space of a RAID striped mass storage system is topologically organized as a plurality of basic units of storage space for storing data items in data blocks. A topological data formatter includes a write data buffer for each data type and an initial data classifier initially categorizes each data item as a structured data type having defined data characteristics or a general data type having variable data characteristics and writes each structured data type data item into a corresponding type buffer. A topological data classifier topologically categorizes each general data type data item as a full-basic unit data type forming data blocks or as a partial-basic unit data type forming partial data blocks and writes each data item into corresponding full-basic type buffer or partial-basic type buffer. Upon a write to storage space, the initial data classifier orders structured data type data items into data block groups corresponding to a basic storage units and writes the data block groups into corresponding areas of storage space. The topological data classifier re-executes the topological classification of full-basic and partial-basic unit data type data items, orders the data items into full-basic or partial-basic unit data block groups, and writes the data block groups into corresponding areas of storage space.

14 Claims, 5 Drawing Sheets

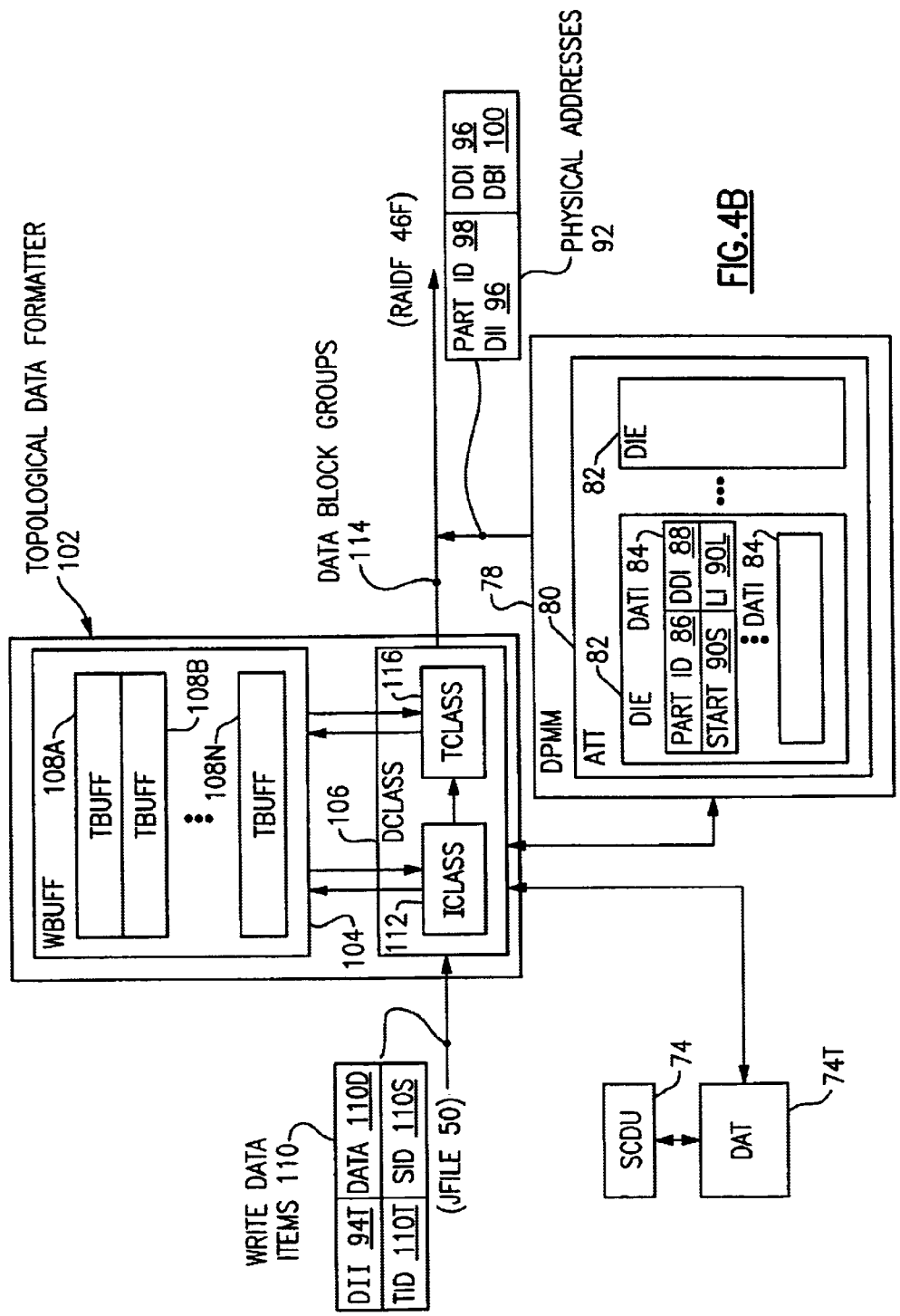

DATA TYPE AND TOPOLOGICAL DATA CATEGORIZATION AND ORDERING FOR A MASS STORAGE SYSTEM

CROSS REFERENCES TO RELATED APPLICATIONS

The present Application is related to:

U.S. patent application Ser. No. 09/580,187 filed May 26, 2000 by Robert Lawrence Fair for A MULTIPLE HIERARICHAL/PEER DOMAIN FILE SERVER WITH DOMAIN BASED, CROSS DOMAIN COOPERATIVE, FAULT HANDLING MECHANISMS;

U.S. patent application Ser. No. 09/580,186 filed May 26, 2000 by Robert Lawrence Fair for A FAULT HANDLING MONITOR TRANSPARENTLY USING MULTIPLE TECHNOLOGIES FOR FAULT HANDLING IN A MULTIPLE HIERARICHAL/PEER DOMAIN FILE SERVER WITH DOMAIN CENTERED, CROSS DOMAIN COOPERATIVE FAULT HANDLING MECHANISMS;

U.S. patent application Ser. No. 09/580,539 filed May 26, 2000 by Earle Trounson MacHardy Jr. and Mike Aram de Forest for a FAULTTOLERANT, LOW LATENCY SYSTEM RESOURCE WITH HIGH LEVEL LOGGING OF SYSTEM RESOURCE TRANSACTIONS AND CROSS-SERVER MIRRORED HIGH LEVEL LOGGING OF SYSTEM RESOURCE TRANSACTIONS; now U.S. Pat. No. 6,578,160;

U.S. patent application Ser. No. 09/579,428 filed May 26, 2000 by John A. Scott and James Gregory Jones for a FAULT TOLERANT SHARED SYSTEM RESOURCE WITH COMMUNICATIONS PASSTHROUGH PROVIDING HIGH AVAILABILITY COMMUNICATIONS;

U.S. patent application Ser. No 09/579,427 filed May 26, 2000 by Mark Andrew O'Connell for TOPOLOGICAL DATA CATEGORIZATION AND FORMATTING FOR A MASS STORAGE SYSTEM; and, U.S. patent application Ser. No. 09/579,670 filed May 26, 2000 by Miles Aram de Forest for FAULT TOLERANT SYSTEM SHARED SYSTEM RESOURCE WITH STATE MACHINE LOGGING.

FIELD OF THE INVENTION

The present invention pertains to a method and apparatus for storing data in a mass storage system and, in particular, for a method and apparatus for storing data in a mass storage system, and in particular a mass storage system implementing RAID technology, by data type and topological categorization and ordering.

BACKGROUND OF THE INVENTION

A continuing problem in computer systems is in providing secure, fault tolerant resources, such as communications and data storage resources, such that communications between the computer system and clients or users of the computer system are maintained in the event of failure and such that data is not lost and can be recovered or reconstructed without loss in the event of a failure. This problem is particularly severe in networked systems wherein a shared resource, such as a system data storage facility, is typically comprised of one or more system resources, such as file servers, shared among a number of clients and accessed through the system network. A failure in a shared resource, such as in the data storage functions of a file server or in communications between clients of the file server and the client file systems supported by the file server, can result in failure of the entire system. This problem is particularly severe in that the volume of data and communications and the number of data transactions supported by a shared resource such as a file server are significantly greater than within a single client system, resulting in significantly increased complexity in the resource, in the data transactions and in the client/server communications. This increased complexity results in increased probability of failure and increased difficulty in recovering from failures. In addition, the problem is multidimensional in that a failure may occur in any of a number of resource components or related functions, such as in a disk drive, in a control processor, or in the network communications.

Considering networked file server systems as a typical example of a shared system resource of the prior art, the filer server systems of the prior art have adopted a number of methods for achieving fault tolerance in client/server communications and in the file transaction functions of the file server, and for data recovery or reconstruction. These methods are typically based upon redundancy, that is, the provision of duplicate system elements and the replacement of a failed element with a duplicate element or the creation of duplicate copies of information to be used in reconstructing lost information. For example, many systems of the prior art employ multiple, duplicate parallel communications paths or multiple, duplicate parallel processing units, with appropriate switching to switch communications or file transactions from a failed communications path or file processor to an equivalent, parallel path or processor, to enhance the reliability and availability of client/file server communications and client/client file system communications. Yet other methods of the prior art utilize information redundancy to allow the recovery and reconstruction of transactions lost due to failures occurring during execution of the transactions. These methods include caching, transaction logging and mirroring wherein caching is the temporary storage of data in memory in the data flow path to and from the stable storage until the data transaction is committed to stable storage by transfer of the data into stable storage, that is, a disk drive, or read from stable storage and transferred to a recipient. Transaction logging, or journaling, temporarily stores information describing a data transaction, that is, the requested file server operation, until the data transaction is committed to stable storage, that is, completed in the file server, and allows lost data transactions to be re-constructed or re-executed from the stored information. Mirroring, in turn, is often used in conjunction with caching or transaction logging and is essentially the storing of a copy of the contents of a cache or transaction log in, for example, the memory or stable storage space of a separate processor as the cache or transaction log entries are generated in the file processor.

The use of multiple, duplicate parallel communications paths or multiple, duplicate parallel processing units, caching, transaction logging and mirroring, however, are often unsatisfactory because they are often costly in system resources and require complex administrative and synchronization operations and mechanisms to manage the caching, transaction logging and mirroring functions and subsequent transaction recovery operations, and significantly increase the file server latency, that is, the time required to complete a file transaction.

One of the most frequently used methods of the prior art for the preservation and recovery of data and file transactions is RAID technology, which is a family of industry standard methods for distributing redundant data and error correction information across a redundant array of disk drives that essentially operates as a single, very large mass storage device, which is often implemented as a networked file server. RAID technology allows a failed disk drive to be replaced by a redundant drive and allows the data in the failed disk to be reconstructed from the redundant data and error correction information.

The increased power and speed of contemporary networked computer systems, however, has resulted in a corresponding demand for significantly increased mass storage capability because of the increased volumes of data dealt with by the systems and the increased size of the operating system and applications programs executed by such systems. Most mass storage devices, however, are characterized by relatively low data access and transfer rates compared to the computer systems with operate with the data and programs stored therein. As a consequence, and although the mass storage capabilities of host computer systems has been increased significantly, the speed of data read and write access has not increased proportionally. While there have been many attempts in the prior art to solve the problem of data access speed for mass storage systems, they have typically taken the form of increasing the number of disk drives, for example, to store related data items and their associated parity information across several drives in parallel, thereby overlapping the initial data access time to each drive and increasing the efficiency of bus transfers. An extreme manifestation of this approach was found, for example, in the Thinking machines Corporation CM-2 system which operated with 39 bit words, each containing 32 data bits and 7 parity bits, and stored the bits of each word in parallel across 39 disk drives, on bit to each drive.

A more typical method for increasing the speed of data read and write access is "striping", wherein data and parity information are spread over several disk drives in an pattern referred to as a "stripe" and wherein a "stripe" is the amount of information for which for which a given RAID system generates and stores parity. Because the parity information for a stripe is generated for and from all of the data in a stripe, a stripe is effectively the smallest unit of data storage in a RAID striped system, that is, is stripe is always written as an entity. A RAID 5 system, for example, uses five disk drives and a stripe is comprised of four blocks of information, with one block being stored on each of four of the disk drives and with a fifth block containing parity information for the four information blocks being stored in the fifth disk drive. Striping is customarily employed to increase the speed with which information may be written to or read from the disk drives of a mass storage system as the information is distributed across the disk drives so that reads and writes of segments of information from and to the disk drives can be overlapped. Striping also facilitates the reconstruction of information in the event of a disk drive failure when used with parity information or an error detection and correction code. That is, the storing of information across a plurality of disk drives so that a single disk drive contains only a relatively small part of any body of information thereby limits the damage to a given body of information in the event of a failure or error, and allows the damaged information to be more easily recovered or reconstructed from the surviving information.

A limiting factor in the various methods for enhancing the speed of information read and write access, however, is the need to store not only parity information or error correcting codes but also several different types of data with very different storage characteristics and very different access requirements. That is, data and parity information are usually stored in units of fixed but possibly different sizes, which will typically depend upon the type of data, and the amount of data in a given file, as well as the amount of data to be read or written in a given read or write operation, will typically vary substantially. Storage space in the disk drives, however, is typically allocated in units of fixed size, which may be optimum for only a single type of data, and the storage space is formatted according to the selected RAID method implemented in the system. As a result, there are often significant differences between the optimum storage formats of various forms of information and the storage topology of the disks. As a result, the amount and location of the data in a write operation, for example, will rarely coincide with the format in which the data is stored on the disks and the reading or writing of a given type of information will often result in inefficient disk read/write operations, such as increased disk traverse and search times and frequent and time consuming read-modify-write operations, thereby reducing the information transfer rates. This problem is further compounded in that the systems of the prior art typically distinguish only between data and parity information when writing information to the disks and not between types of data and are optimized to maximize the use of storage space by avoiding or eliminating unused blocks of storage space. As a result, logically contiguous blocks of a given type of data are often physically stored on the disks as smaller, non-contiguous blocks separated by blocks of other types of data. This optimizes the use of physical storage space, but increases the disk traverse and search time required for a read or write operation, thereby further reducing the data transfer rate. These problems are compounded still further because the read/write access requirements for parity information and data, and for different types of data, vary significantly. For example, parity information is typically written or read, modified and rewritten upon each data write to disk and thus has high write access requirements, but has low read access requirements because the parity information is rarely read except to reconstruct data from a failed disk drive. As a result, information having widely varying read and write access requirements is typically intermixed on the disks, so that rarely accessed information must often be traversed and searched in order to access frequently accessed data, thereby still further reducing the data transfer rate.

The present invention provides a solution to these and other problems of the prior art.

SUMMARY OF THE INVENTION

The present invention is directed to a method and apparatus for storing data in a mass storage system, and in particular a mass storage system implementing RAID technology, by data type and topological categorization and ordering.

According to the present invention, a mass storage system includes a mass storage space for storing data items of a plurality of data types wherein each data item contains data of a corresponding data type and each data type is defined by the characteristics of the information represented by the data and wherein the storage space is topologically organized as a plurality of basic units of storage space wherein each basic unit of storage space contains storage space for a predetermined number of data blocks of predetermined sizes. A topological data formatter for storing the data in the storage space includes a write data buffer for and corresponding to each data type and an initial data classifier for data type categorizing of each data item to be written into the storage space as a member of a data type by performing an initial categorization of each data item to identify whether a data item is a member of a structured data type having defined data characteristics or a general data type having variable data characteristics. The initial data classifier then writes each data item that is a member of a structured data types into a corresponding type buffer and provides each data item that is a member of a general data type of a topological data classifier. The topological data classifier performs a topological categorization of each data item that is a member of a general data type and identifies whether each data item that is a member of a general data type is a full-basic unit data type wherein the data of the data items form one or more data block groups conforming to the basic unit of storage space or a partial-basic unit data type wherein the data of the data items form one or more data block groups differing from the basic unit of storage space. The topological data classifier then writes each data item that is a full-basic unit data type into a full-basic type buffer and writes each data item that is a partial-basic unit data type into a partial-basic type buffer. Subsequently, and upon performing a write of the data items to the mass storage, the initial data classifier reads each data item from the corresponding type buffer and for each data item of a structured data type, orders the data of the data items into one or more data block groups wherein each data block group corresponds to a basic unit of storage and writes the one or more data block groups of each structured data type into a corresponding data type area of the storage space. For each data item of the full-basic unit type and of the partial-basic unit type, the topological data classifier re-executes the topological classification of each data item as a full-basic unit data type or as a partial-basic unit data type, orders the data of each data item of a full-basic unit data type and the data of each data item of a partial-basic unit data type into one or more corresponding full-basic unit data block groups or one or more corresponding partial-basic unit data block groups, and writes the full-basic unit data block groups and the partial-basic unit data block groups into corresponding data type areas of the storage space.

In further embodiment of the present invention, and upon writing each data item into a corresponding type buffer, the topological data formatter combines the data of a data item being written into a type buffer and the data of one or more data items residing in the type buffer to form a full-basic unit of storage space. In still further embodiments of the present invention, and upon performing a write of the data items to the mass storage, the topological data formatter returns all data items forming partial-basic unit data block groups to the corresponding type buffers for re-ordering into full-basic unit data block groups in a subsequent write to the storage space.

In a presently preferred embodiment, each basic unit of storage space is a stripe of a striped mass storage system and each stripe contains storage space for a predetermined number of data blocks. Also, the mass storage space is preferrably structured into a plurality of data partitions wherein each data partition corresponds to a data type and is used to store data of the corresponding data type. In addition, and in a presently preferred embodiment of the mass storage system, the mass storage system is a RAID technology storage system and each stripe further includes at least one data block for storing data recovery information.

DESCRIPTION OF THE DRAWINGS

The foregoing and other objects, features and advantages of the present invention will be apparent from the following description of the invention and embodiments thereof, as illustrated in the accompanying figures, wherein:

FIG. 4B is a block diagram of a topological categorizer of the present invention.

DESCRIPTION OF THE INVENTION

Figure 1:
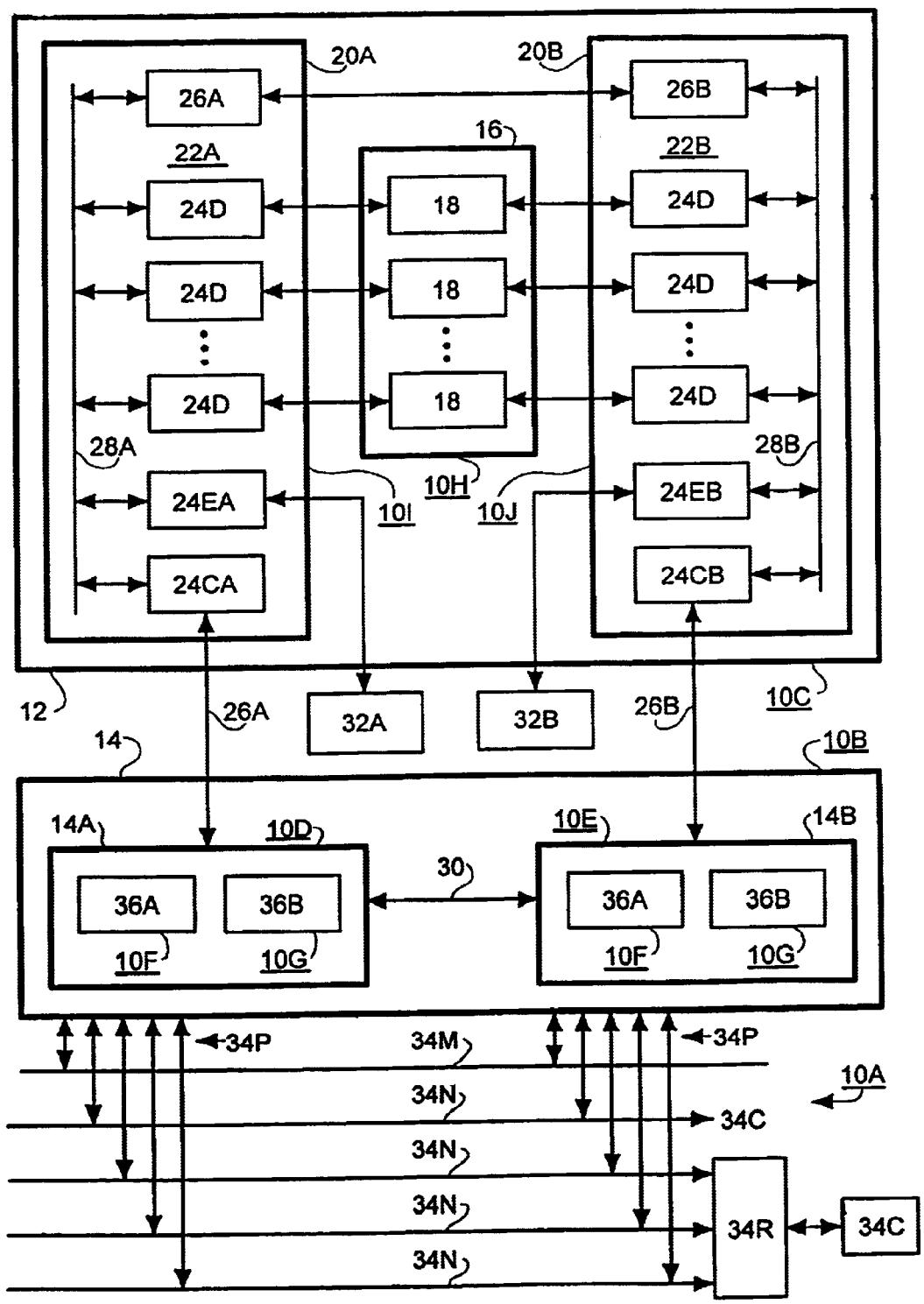
FIG. 1 is a block diagram of a networked file server in which the present invention may be implemented.

A. General Description of a High Availability Shared Resource (FIG. 1)

1. Introduction

As will be described in the following, the present invention is directed to a high availability resource, such as a file server, communications server, print server, shared among a number of users in a networked system. A resource of the present invention is comprised of an integrated, cooperative cluster of hierarchical and peer domains wherein each domain performs or provides one or more related or functions integral to the functions or services supported by the resource and wherein a domain may be comprised of or include sub-domains. For example, one or more domains may provide communications services between the resource and networked clients, other domains may perform high level file system, communications or print functions, while other domains may perform lower level file system, communications and print functions. In the instance of hierarchically related domains, one domain may control another or may support a higher or lower level domain by performing related higher or lower level functions. For example, a higher level domain may perform high level file or communications function while a related lower level domain may perform lower level file or communications functions. Peer domains, in turn, may perform identical or parallel functions, for example, to increase the capacity of the resource with respect to certain functions by sharing the task load, or may perform related tasks or functions in mutual support to together comprise a domain. Yet other domains may be peer domains with respect to certain functions and hierarchically related domains with respect to other functions. Finally, and as will be described in the following discussions, certain domains will include fault handling mechanisms that operate separately and independently of fault handling mechanisms of other domains, but cooperatively to achieve a high level of resource availability.

The present invention may be implemented, for example and for purposes of the following descriptions, in a High Availability Networked File Server (HAN File Server) 10, and this implementation will be described in detail in the following discussions as an exemplary embodiment of the present invention. As illustrated in FIG. 1, a HAN File Server 10 in which the present invention is implemented may be, for example, a Data General Corporation Clarion™ File Server, providing highly available file system shares, that is, storage space, to networked clients with high integrity of data written to the shares through the use of a journaled file system, network failover capabilities, and back-end Redundant Array of Inexpensive Disks (RAID) storage of data. In a presently preferred implementation, a HAN File Server 10 supports both industry standard Common Internet File System Protocol (CIFS) and Network File System (NFS) shares, wherein the contrasting models for file access control as used by CIFS and NFS are implemented transparently. A HAN File Server 10 also integrates with existing industry standard administrative databases, such as Domain Controllers in a Microsoft Windows NT environment or Network File System (NIS) domains for Unix environments.

The presently preferred implementation provides high performance through use of a zero-copy IP protocol stack, by tightly integrating the file system caching methods with the back-end RAID mechanisms, and by utilizing a dual storage processor to provide availability of critical data by mirroring on the peer storage processor to avoid the requirement for writes to a storage disk. As will be described in detail in the following, a HAN File Server 10 of the presently preferred implementation operates in a dual processor, functional multiprocessing mode in which one processor operates as a file system processor to perform all aspects of writing and reading data to and from a collection of highly available RAID disks. The second processor operates as a front end processor to perform all network and file system operations for transferring data between the clients and the disk resident file system and supports a network stack, a CIFS/NFS implementation, and a journaled file system.

In the presently preferred implementation, the file system is implemented as a log-based, quick recovery file system with a kernel based CIFS network stack and supports NFS operations in a second mode, but modified according to the present invention to provide highly available access to the data in the file system. The file system provides protection at the disk level against the loss of a disk unit through the use of RAID technology. When a disk drive is lost, the RAID mechanism provides the mechanism to rebuild the data onto a replacement drive and provides access to the data when operating without the lost disk drive. The file system further provides protection against the loss of a storage processor by preserving all data changes that network clients make to the file system by means of a data reflection feature wherein data changes stored in memory on one storage processor are preserved in the event of the hardware or software failure of that storage processor. The reflection of in-core data changes to the file system is achieved through an inter-storage processor communication system whereby data changes to the file system communicated by clients on one storage processor and using either NFS or CIFS are reflected and acknowledged as received by the other storage processor before an acknowledgment is returned to the network client storing the data. This insures that a copy of the data change is captured on the alternate storage processor in the event of failure on the original storage processor and, if and when failure occurs, the changes are applied to the file system after it has failed over to the alternate storage processor. As will be described, this reflection mechanism is built on top of underlying file system recovery mechanisms and utilizes the underlying recovery mechanisms to correct the file system before proceeding with recovery of the file system.

As will be described, a HAN File Server 10 of the presently preferred implementation provides high availability communications between clients of the server and the client file systems supported on the server through redundant components and data paths and communications failure handling mechanisms to maintain communications between clients and client file systems. A HAN File Server 10 of the present invention also includes file transaction and data backup and recovery systems to prevent the loss of file transactions and data and to permit the recovery or reconstruction of file transactions and data. In the event of a system hardware or software failure, the surviving components of the system will assume the tasks of the failed component. For example, the loss of a single Ethernet port on a storage processor will result in the network traffic from that port being assumed by another port on the alternate storage processor. In a like manner, the loss of any part of a storage processor that would compromise any aspect of its operations will result in the transfer of all network traffic and file systems to the surviving storage processor. In further example, the data and file transaction and backup mechanisms will permit the recovery and reconstruction of data and file transactions either by the failed component, when restored, or by a corresponding component and will permit a surviving component to assume the file transactions of a failed component. In addition, the loss of a single disk drive will not result in the loss of access to the data because the RAID mechanisms will utilize the surviving disks to provide access to the reconstructed data that had been residing on the lost drive. In the instance of power failures, which affect the entire file server, the file server state is preserved at the instant of the power failure and the in core data is committed to stable storage and restored when power is recovered, thereby preserving all data changes made before power was lost. Finally, the communications and data and file transaction failure recovery mechanisms of HAN File Server 10 are located in each domain or sub-system of the server and operate separately and independently of one another, but cooperatively to achieve a high level of availability of client to file system communications and to prevent loss and allow recovery of data and file transactions. The failure recovery mechanisms of a HAN File Server 10, however, avoid the complex mechanisms and procedures typically necessary to identify and isolate the source of a failure, and the complex mechanisms and operations typically necessary to coordinate, synchronize and manage potentially conflicting fault management operations.

2. Detailed Description of a HAN File Server 10 (FIG. 1)

Referring to FIG. 1, therein is shown a diagrammatic representation of an exemplary HAN File Server 10 in which the present invention may be implemented, such as a Data General Corporation Clarion™ File Server. As illustrated, a HAN File Server 10 includes a Storage Sub-System 12 and a Control/Processor Sub-System 14 comprised of dual Compute Blades (Blades) 14A and 14B that share Storage Sub-System 12. Compute Blades 14A and 14B operate independently to provide and support network access and file system functions to clients of the HAN File Server 10, and operate cooperatively to provide mutual back up and support for the network access and file system functions of each other.

a. Storage Sub-System 12 (FIG. 1)

Storage Sub-System 12 includes a Drive Bank 16 comprised of a plurality of hard Disk Drives 18, each of which is bi-directionally read/write accessed through dual Storage Loop Modules 20, which are indicated as Storage Loop Modules 20A and 20B. As illustrated, Storage Loop Modules 20A and 20B each include a Multiplexer Bank (MUXBANK) 22, indicated as MUXBANKs 22A and 22B, each of which includes a plurality of Multiplexers (MUXs) 24 and a Loop Controller 26, represented respectively as Loop Controllers 26A and 26B. The MUXs 24 and Loop Controller 26 of each Loop Controller Module 20 are bidirectionally interconnected through a MUX Loop Bus 28, represented as MUX Loop Buses 28A and 28B.

As illustrated, MUXBANKs 22A and 22B each include a Disk Drive MUX 24 (MUX 24D) corresponding to and connected to a corresponding one of Disk Drives 18, so that each Disk Drive 18 of Drive Bank 16 is bidirectionally read/write connected to a corresponding DMUX 24D in each of MUXBANKs 20A and 20B. Each of MUXBANKs 20A and 20B is further bidirectionally connected with the corresponding one of Compute Blades 14A and 14B through, respectively, MUX 24CA and MUX 24CB, and Compute Blades 14A and 14B are bidirectionally connected through Blade Bus 30. In addition, each of MUXBANKS 20A and 20B may include an External Disk Array MUX 24, represented as MUXs 24EA and 24EB, that is bidirectionally connected from the corresponding MUX Loop Bus 28A and 28B and bidirectionally connected to an External Disk Array (EDISKA) 32, respectively indicated as EDISKAs 32A and 32B, providing additional or alternate disk storage space.

Each of Disk Drives 18 therefore bidirectionally communicates with a MUX 24 of MUX Bank 22A and with a MUX 24 of MUX Bank 22B and the MUXs 24 of MUX Bank 20A are interconnected through a Loop Bus 26A while the MUXs 24 of MUX Bank 22B are interconnected through a Loop Bus 26B, so that each Disk Drive 18 is accessible through both Loop Bus 26A and Loop Bus 26B. In addition, Processor Blade 14A bidirectionally communicates with Loop Bus 26A while Processor Blade 14B bidirectionally communicates Loop Bus 26B and Processor Blades 14A and 14B are directly interconnected and communicate through Blade Loop (Blade) Bus 30. As such, Processor Blades 14A and 14B may bidirectionally communicate with any of Disk Drives 18, either directly through their associated Loop Bus 26 or indirectly through the other of Processor Blades 14, and may communicate directly with each other.

Figure 2:
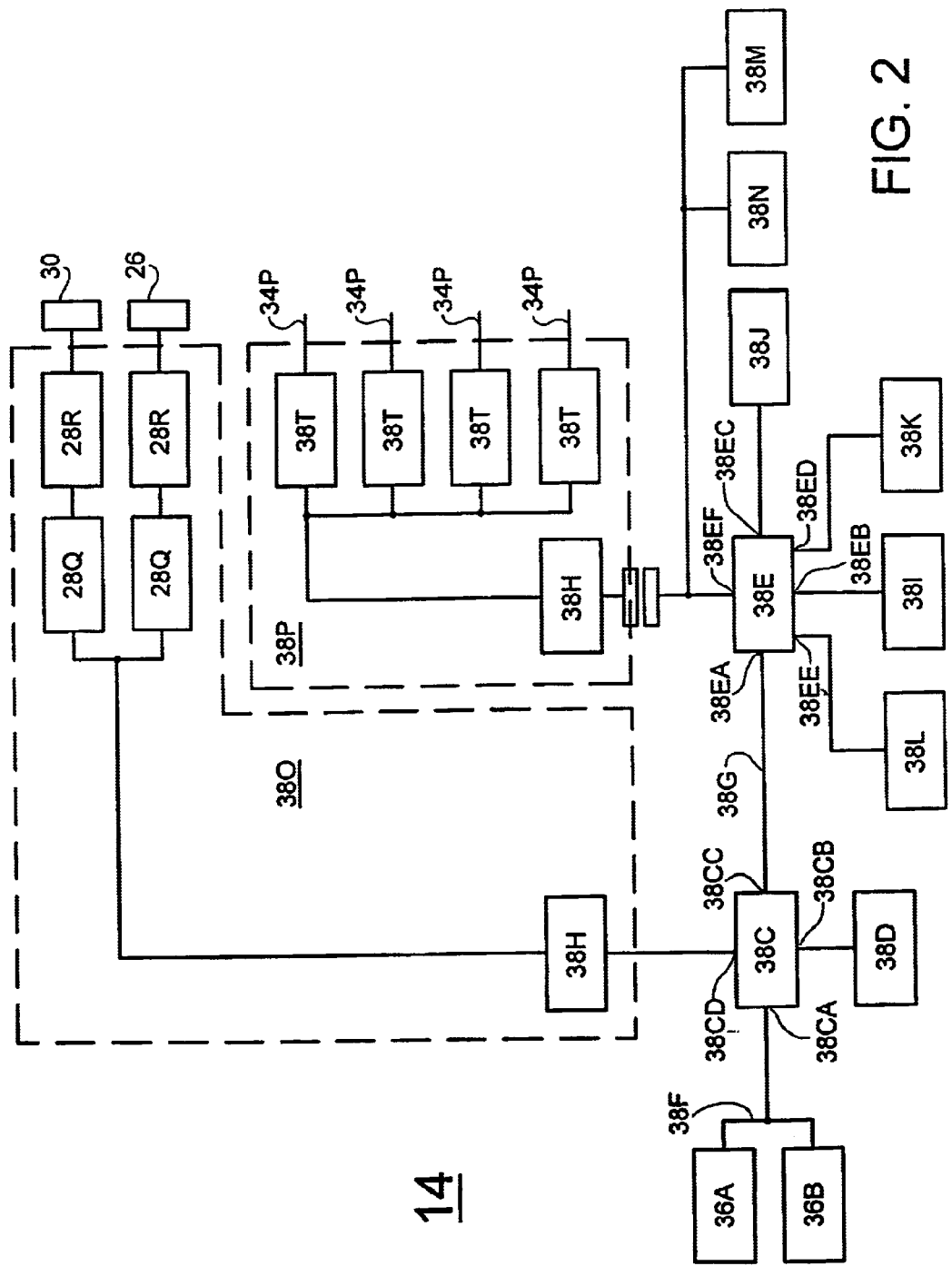
FIG. 2 is a block diagram of a processor core of a domain of the file server of FIG. 1.

Lastly with respect to Storage Sub-System 12, in the presently preferred embodiment of a HAN Filer Server 10, and for example, each Disk Drive 18 is a hot-swap fiber channel disk drive encased in a carrier for easy user replacement and the drives and carriers plug into a midplane, which distributes power and contains MUX Loop Buses 26A and 26B, thereby interconnecting each dual ported drive to MUXs 24 and MUXs 24 with Loop Controllers 26. MUXs 24 are fiber channel MUX devices and Loop Controllers 26 include micro-controllers to control the path selection of each MUX device to selectively connect each Disk Drive 18's dual ports in or out of the fiber channel MUX Loop Buses 26A and 26B. MUXs 24CA and 24CB and MUXs 24EA and 24E are similarly fiber channel MUX devices and connect Storage Sub-System 12 to Compute Blades 14A and 14B and EDISKAs 32A and 32B through fiber channel loop buses, while Compute Blade Bus 30 is likewise a fiber channel bus.

b. Control/Processor Sub-System 14 (FIGS. 1 and 2)

As described above, Control/Processor Sub-System 14 is comprised of dual Compute Blades (Blades) 14A and 14B interconnected through Compute Blade Bus 30, which together comprise a computational and control sub-system that controls the operations of shared Storage Sub-System 12. Compute Blades 14A and 14B operate independently to provide and support network access and file system functions to clients of the HAN File Server 10, and operate cooperatively to provide mutual back-up and support for the Network 34 access and file system functions of each other. As illustrated in FIGS. 1 and 2, each Blade 14 includes a number of Network Ports (Ports) 34P connected to Networks 34, which comprise the bi-directional data communications connections between the HAN File Server 10 and Clients 34C using the HAN File Server 10. As illustrated, the networks may include, for example, a plurality of Client Networks 34N connecting to Clients 34C and a Management Network 34M and may include a Router 34R connecting to remote Clients 34C. As will be understood by those of ordinary skill in the relevant arts, Networks 34 may be comprised, for example, of local area networks (LANs), wide area networks (WANs), direct processor connections or buses, fiber optic links, or any combination thereof.

As indicated in FIG. 1, each of Blades 14 is comprised of dual Processing Units 36A and 36B which share coherent access to memory and other elements, such as communications components. Each of Processing Units 36A and 36B is a fully functional computational processing unit executing a full operating system kernel and cooperate in a functional multi-processing structure. For example, and in the presently preferred implementation as will be described further in the following descriptions, one of Processing Units 36 performs RAID functions while the other Processing Unit 36 performs network functions, protocol stack functions, CIFS and NFS functions, and file system functions.

c. General Architecture of a HAN File Server 10 and HAN File Server 10 Fault Handling Mechanisms (FIGS. 1 and 2)

As described, therefore, a HAN File Server 10 of the present invention is comprised of a cluster of hierarichal and peer domains, that is, nodes or sub-systems, wherein each domain performs one or more tasks or functions of the file server and includes fault handling mechanisms. For example, the HAN File Server 10 is comprised of three hierarchical Domains 10A, 10 and 10C comprising, respectively, Networks 34N, Control/Processor Sub-System 14 and Storage Sub-System 12, which perform separate and complementary functions of the file server. That is, Domain 10A provides client/server communications between Clients 34 and the HAN File Server 10, Domain 10B, that is, Control/Processor Sub-System 14, supports the client/server communications of Domain 10A and supports high level file system transactions, and Domain 10C, that is, Storage Sub-System 12, supports the file systems of the clients. Control/Processor Sub-System 14, in turn, is comprised of two peer Domains 10D and 10E, that is, Blades 14A and 14B, which perform parallel functions, in particular client/server communications functions and higher and lower level file system operations, thereby sharing the client communications and file operations task loads. As will be described in detail in following descriptions, the domains comprising Blades 14A and 14B also include independently functioning fault handling mechanisms providing fault handling and support for client/server communications, inter-Blade 14 communications, high level file system functions, and low level file system functions executed in Storage Sub-System 12. Each Blade 14, in turn, is comprised to two hierarchical Domains 10F and 10G, based on Processing Units 36A and 36B, that perform separate but complementary functions that together comprise the functions of Blades 14A and 14B. As will be described, one or Processing Units 36 forms upper Domain 10F providing high level file operations and client/server communications with fault handling mechanisms for both functions. The other of Processing Units 36 forms lower Domain 10G providing lower level file operations and inter-Blade 14 communications, with independently operating fault handling mechanisms operating in support of both functions and of the server functions and fault handling mechanisms of the upper Domain 10F. Finally, Storage Sub-System 12 is similarly comprised of a lower Domain 10H, which comprises Disk Drives 18, that is, the storage elements of the server, and indirectly supports the RAID mechanisms supported by Domains 10E of Blades 14, and peer upper Domains 10I and 10J, which include Storage Loop Modules 20A and 20B which support communications between Domains 10D and 10E and Domain 10H.

Therefore, and as will be described in the following, each HAN File Server 10 domain directly or indirectly contains or includes one or more fault handling mechanisms that operate independently and separately from one another but cooperatively with one another, without a single, central master or coordinating mechanism, so that the functions or operations of a failed component of one domain will be assumed by a corresponding component of a related domain. In addition, and as will also be described in the following, certain of the fault handling mechanisms of a HAN File Server 10 employ multiple different technologies or methods transparently to provide continued functionality in the event of a single or multiple failures.

Having described the overall structure and operation of a HAN File Server 10, the following will describe each domain of a HAN File Server 10 in further detail, and the structure and operation of the HAN File Server 10 fault handling mechanisms.

1. Processing and Control Core of a Blade 14

Referring to FIG. 2, therein is illustrated a presently preferred implementation of a Blade 14 wherein it is shown that a Blade 14 includes dual Processors 38A and 38B, which respectively form the computational cores of dual Processing Units 36A and 36B, and a number of shared elements, such as Memory Controller Hub (MCH) 38C, Memory 38D, and an Input/Output Controller Hub (ICH) 38E. In a present implementation, for example, each of Processors 38A and 38B is an Intel Pentium-III Processor with an internal Level 2 cache, MCH 38C and ICH 38E is an Intel 820 chipset and Memory 38D is comprised of 1 GB (1 gigabyte) of RDRAM or SDRAM.

As shown, Processors 38A and 38B are interconnected with MCH 38C through a pipelined Front Side Bus (FSB) 38F and a corresponding FSB Port 38Ca of MCH 38C. As will be well understood by those of ordinary skill in the arts, MCH 38C and MCH 39C's FSB port support the initiation and reception of memory references from Processors 38A and 38B, the initiation and reception of input/output (I/O) and memory mapped I/O requests from Processors 38A and 38B, the delivery of memory data to Processors 38A and 38B from Memory 38C, and the initiation of memory snoop cycles resulting from memory I/O requests. As also shown, MCH 38C further includes a Memory Port 38Cb to Memory 38D, a Hublink Port 38Cc connecting to a Hublink Bus 38G to ICH 38E and four AGP Ports 38Cd functioning as industry standard Personal Computer Interconnect (PCI) buses, each of which is connected to a Processor to Processor Bridge Unit (P-P Bridge) 38H, such as an Intel 21154 chip.

ICH 38E, in turn, includes a Hublink Port 38Ea connecting to Hublink Bus 38G to MCH 38C, a Firmware Port 38Eb connecting to a Firmware Memory 38I, a Monitor Port 38Ec connecting to a Hardware Monitor (HM) 38J, and an IDE Drive Port 38Ed connecting to a Boot Drive 38K, an I/O Port 38Ee connecting to a Super I/O Device (Super I/O) 38L, and a PCI Port 38Ef connecting to, among other elements, a VGA Device (VGA) 38M and a Management Local Area Network Device (LAN) 38N, all of which will be well understood by those of ordinary skill in the arts.

2. Personal Computer Compatibility Sub-System of a Blade 14

ICH 38E, Super I/O 38L and VGA 38M together comprise a Personal Computer (PC) compatibility subsystem providing PC functions and services for the HAN File Server 10 for purposes of local control and display functions. For these purposes, ICH 38E, as will be understood by those of ordinary skill in the arts, provides IDE controller functions, an IO APIC, 82C59 based timers and a real time clock. Super IO 38L, in turn, may be, for example, a Standard Microsystems Device LPC47B27x and provides an 8042 keyboard/mouse controller, a 2.88 MB super IO floppy disk controller and dual full function serial ports while VGA 38M may be, for example, is a Cirrus Logic 64-bit VisualMedia® Accelerator CL-GD5446-QC supporting a 1 MB frame buffer memory.

3. Firmware and BIOS Sub-System of a Blade 14

ICH 38E and Firmware Memory 38I together comprise a firmware and BIOS subsystem executing the customary firmware and BIOS functions, including power-on self-test (POST) and full configuration of Blade 14A and 14B resources. The firmware and BIOS, which is, for example, a standard BIOS as is available from AMI/Phoenix, reside in Firmware Memory 38I, which includes 1 MB of Flash memory. After the POST completes, the BIOS will scan for the PCI buses, described above, and during this scan will configure the two PCI-to-PCI bridges, described above and in the following descriptions, and will detect the presence of, and map in the PCI address space, the fiber channel and LAN controllers on the back-end and front-end PCI buses described in a following discussion. This information is noted in MP compliant tables that describe the topology of the IO subsystem along with the other standard sizing information, such as PC compatibility IO, memory size, and so on, and POST performs a simple path check and memory diagnostic. After POST completes, a flash resident user binary code segment is loaded which contains an in-depth pre-boot diagnostic package, which also initializes the fiber channel devices and checks the integrity of the components on the compute blade by exercising data paths and DRAM cells with pattern sensitive data. After the diagnostics are run, control is either turned back over to the BIOS or to a bootstrap utility. If control is turned over to the BIOS the system will continue to boot and, if control is turned over to the bootstrap utility, the boot block is read from the fibre disk and control is then passed to the newly loaded operating system's image. In addition, this sub-system provides features and functions in support of the overall system management architecture, including error checking logic, environmental monitoring and error and threshold logging. At the lowest level, hardware error and environmental threshold checks are performed that include internal processor cache parity/ECC errors, PCI bus parity errors, RDRAM ECC errors and front-side bus ECC errors. Errors and exceeded environmental threshold events are logged into a portion of the Flash prom in a DMI compliant record format.

4. I/O Bus Sub-Systems of a Blade 14

Lastly, MCH 38C and ICH 38E support two Blade 14 input/output (I/O) bus sub-systems, the first being a Back-End Bus Sub-System (BE BusSys) 38O supported by MCH 38C and providing the previously described bi-directional connections between the Blade 14 and the corresponding Loop Bus 26 of Storage Sub-System 12 and the bi-directional connection between Blades 14A and 14B through Compute Blade Bus 30. The second is a Front-End Bus Sub-System (FE BusSys) 38P supported by ICH 38E which provides the previously described bi-directional connections to and from Networks 34 wherein Networks 34, as discussed previously, may be comprised, for example, of local area networks (LANs), wide area networks (WANs), direct processor connections or buses, fiber optic links, or any combination thereof.

First considering BE BusSys 38O, as described above MCH 38C supports four AGP Ports 38Cd functioning as industry standard Personal Computer Interconnect (PCI) buses. Each AGP Port 38Cd is connected to a Processor to Processor Bridge Unit (P-P Bridge) 38H, such as an Intel 21154 chip, which in turn is connected to the bi-directional bus ports of two Fiber Channel Controllers (FCCs) 38Q, which may be comprised, for example, of Tach Lite fiber channel controllers. The parallel fiber channel interfaces of the FCCs 38Q are in turn connected to the parallel fiber channel interfaces of two corresponding Serializer/Deserializer Devices (SER-DES) 38R. The serial interface of one SER-DES 38R is connected to Compute Blade Bus 30 to provide the communications connection to the other of the dual Blades 14, while the serial interface of the other SER-DES 38R is connected to the corresponding Loop Bus 26 of Storage Sub-System 12.

In FE BusSys 38P, and as described above, ICH 38E includes a PCI Port 38E$f$ and, as shown, PCI Port 38E$f$ is bidirectionally to a Processor to Processor Bridge Unit (P-P Bridge) 38S which may be comprised, for example, of an Intel 21152 supporting a bi-directional 32 bit 33 MHz Front-End PCI bus segment. The Front-End PCI bus segment, in turn, is connected to a set of bi-directional Network Devices (NETDEVs) 38T connecting to Networks 34 and which may be, for example, Intel 82559 10/100 Ethernet controller devices. It will be understood, as described previously, that Networks 34 may be may be comprised, for example, of local area networks (LANs), wide area networks (WANs), direct processor connections or buses, fiber optic links, or any combination thereof, and that NETDEVs 38T will be selected accordingly.

Lastly with respect to BE BusSys 38O and FE BusSys 38P, it should be noted that both BE BusSys 38O and FE BusSys 38P are PCI type buses in the presently preferred embodiment and, as such, have a common interrupt structure. For this reason, the PCI interrupts of BE BusSys 38O and FE BusSys 38P are routed such that the PCI bus devices of BE BusSys 38O do not share any interrupts with the PCI bus devices of FE BusSys 38P.

c. Operation of a HAN File Server 10 (FIGS. 1, 2, 3 and 4)

1. General Operation of a HAN File System 10

Figure 3:
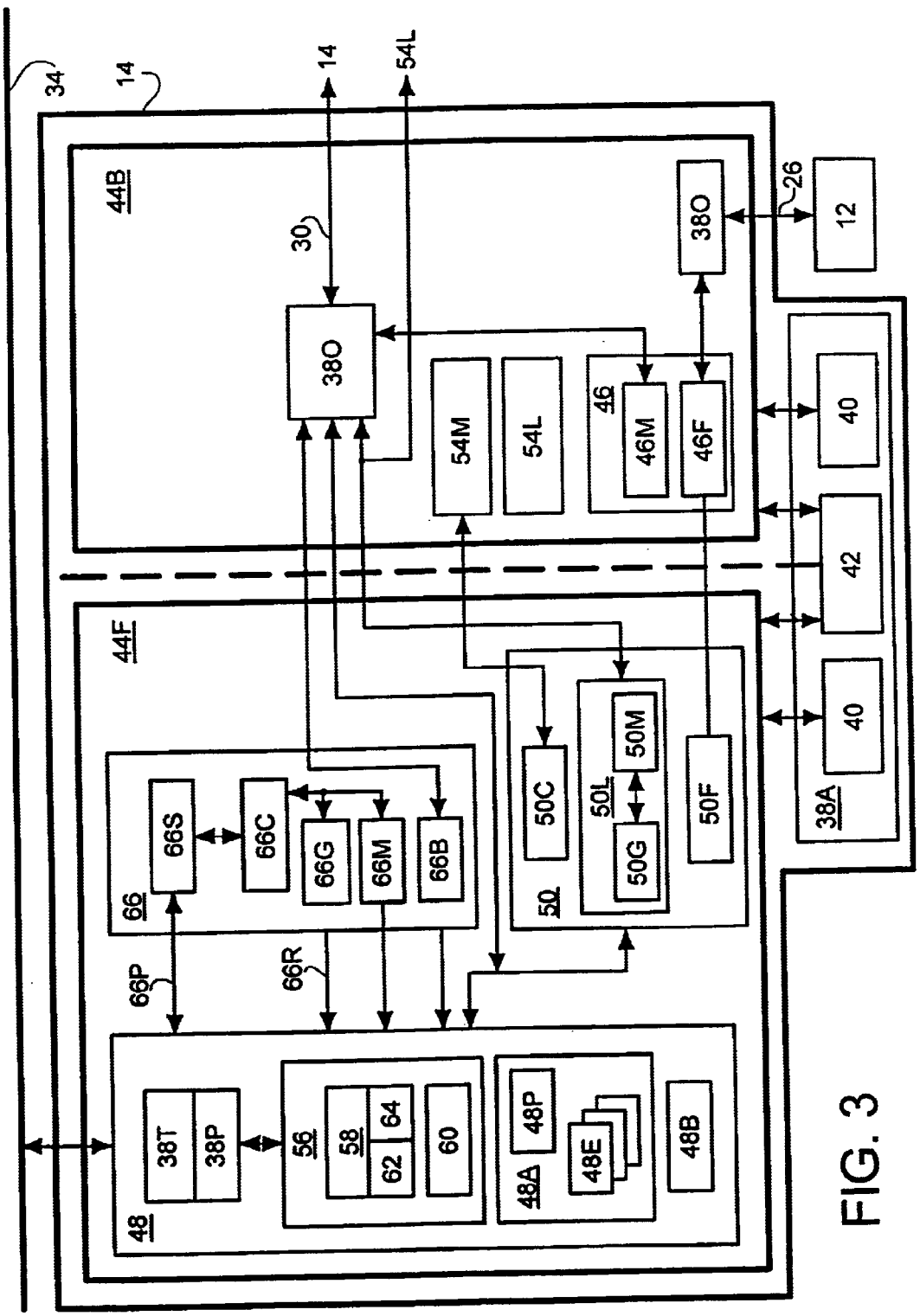
FIG. 3 is a diagrammatic illustration of a domain of the file server of FIG. 1 in further detail.

As described previously, a HAN File System 10 includes dual Compute Blades 14, each of which has complete access to all Disk Drives 18 of the Storage Sub-System 12 and connections to all Client Networks 34N and each of which is independently capable of performing all functions and operations of the HAN File System 10. A diagrammatic representation of the functional and operational structure of a Blade 14 is illustrated in FIG. 3. FIG. 3 shows a single one of Blades 14A and 14B and it will be understood that the other of Blades 14 is identical to and a mirror image of the Blade 14 illustrated.

Within a Blade 14, and as described above, the dual Processing Units 36A and 36B share a number of Blade 14 elements, such as Memory Controller Hub (MCH) 38C, Memory 38D, and an Input/Output Controller Hub (ICH) 38E. Each of Processing Units 36A and 36B operates independently but cooperatively of the other, with each executing a separate copy of a real time Operating System (OS) 40 residing in Memory 38A wherein each copy of the OS 40 provides, for example, basic memory management, task scheduling and synchronization functions and other basic operating system functions for the corresponding one of Processing Units 36A and 36B. Processing Units 36A and 36B communicate through a Message Passing Mechanism (Message) 42 implemented in shared Memory 38A wherein messages are defined, for example, for starting an I/O, for I/O completion, for event notification, such as a disk failure, for status queries, and for mirroring of critical data structures, such as the file system journal, which is mirrored through Blade Bus 30. At initialization, each Blade 14 loads both copies of OS 40 and the RAID, file system and networking images from the back end Disk Drives 18. The RAID kernel executing in one of Processing Units 36A and 36B then partitions the Memory 38A of the Blade 14 between the two instances of OS 40, and initiates operations of Processing Units 36A and 36B after the copies of the OS 40 kernel are loaded. After initialization, the OS 40 kernels communicate through Message 42.

As illustrated in FIG. 3, within each Blade 14 one of Processing Units 36A and 36B is designated as and operates as a Back-End Processor (BEP) 44B and, as described above, includes a RAID Mechanism (RAID) 46 that includes a RAID File Mechanism (RAIDF) 46F that performs RAID data storage and backup functions and a RAID Monitor Mechanism (RAIDM) 46M that performs RAID related system monitoring functions, as well as other functions described below. The other of Processing Units 36A and 36B is designated as and operates as a Front-End Processor (FEP) 44F and performs all network and non-RAID file system operations, including supporting the network drivers, protocol stacks, including CIFS and NFS protocols, and maintaining a journaled file system.

The functions of BEP 44B include executing core RAID file system support algorithms through RAIDF 46F and, through RAIDM 46M, monitoring the operation of Disk Drives 18, monitoring the operations and state of both the Blade 14 in which it resides and the peer Blade 14, and reporting failures to the administrative functions. As described above with respect to FIG. 2 and BE BusSys 38O, BEP 44B also supports communications between Blades 14A and 14B through BE BusSys 38O and Blade Bus 30 and with Disk Drives 18 through BE BusSys 38O and the corresponding Loop Bus 26 of Storage Sub-System 12. RAIDM 46M also monitors the Blade 14 power supplies and executes appropriate actions on the event of a power failure, such as performing an emergency write of critical data structures to Disk Drives 18 and notifying the other of Processing Units 36A and 36B so that the other of Processing Units 36A and 36B may initiate appropriate action. The BEP 44B further provides certain bootstrap support functions whereby run-time kernels can be stored on Disk Drives 18 and loaded at System boot.

FEP 44F, in turn, includes Network Mechanisms (Network) 48 which performs all Network 34 related functions and operations of the Blade 14 and includes the elements of FE BusSys 30P and NetDevs 38T. For example, Network 48 manages and provides the resources available to network clients, including FE BusSys 38P, to provide access to the HAN File System 10 to Clients 34C through Networks 34. As will be described, Network 48 also supports communications failover mechanisms resident in the FEP 44F and other high availability features as described herein.

FEP 44F also includes a Journaled File System (JFile) 50, which communicates with clients of HAN File Server 10 through Network 48 and with the RAID file system functions of RAIDF 46F through Message 42. As indicated, JFile 50 includes a File System Mechanism (FSM) 50F that executes the file system functions of JFile 50 and an Internal Write Cache (WCache) 50C and a Transaction Log (Log) 50L that interoperate with FSM 50F to respectively cache the data and operations of data transactions and to maintain a journal of data transactions. Log 50L, in turn, that includes a Log Generator (LGen) 50G for generating Log Entries (SEs) 50E representing requested data transactions and a Log Memory (LogM) 50M for storing SEs 50E, the depth of LogM 50M depending upon the number of data transactions to be journaled, as which will be discussed further below. As indicated, BEP 44B includes a Cache Mirror Mechanism (CMirror) 54C that communicates with WCache 50C and mirrors the contents of WCache 50C. In addition, the Log 50L of each Blade 14 is mirrored by a Log 50L Mirror Mechanism (LMirror) 54L residing in the opposite, peer Blade 14 wherein the Log 50L of each Blade 14 communicates with the corresponding LMIrror 54L through the path comprising Message 42, BE BusSys 38O and Blade Bus 30.

Finally, FEP 44F includes a Status Monitor Mechanism (Monitor) 52, which monitors notifications from BEP 44B regarding changes in the HAN File System 10 and initiates appropriate actions in response to such changes. These notification may include, for example, notifications from RAIDM 46M regarding the binding of newly inserted disks into a RAID group or raising an SNMP trap for a failed disk, and the operations initiated by Monitor 52 may include, for example, initiating a failover operation or complete Blade 14 shutdown by the failure handling mechanisms of the HAN File Server 10, as will be described in the following, if the RAID functions encounter a sufficiently serious error, and so on.

2. Operation of the File System Mechanisms of a HAN File Server 10 (FIGS. 1, 2 and 3)

As described herein above and as illustrated in FIG. 3, the file server mechanisms of a HAN File Server 10 include three primary components or layers, the first and uppermost layer being the file system mechanisms of JFile 50 with WCache 50C and Log 50L residing on the Front-End Processors 44F of each of Blades 14A and 14B. The lowest layer includes Storage Sub-System 12 with Disk Drives 18 and the file system functions of RAIDF 46F residing on the Back-End Processors 44B of each of Blades 14A and 14B. The third layer or component of the HAN File Server 10 file system mechanisms is comprised of the fault handing mechanisms for detecting and handling faults affecting the operation of the file system mechanisms and for recovery from file system failures. The structure and operation of the upper and lower file system elements have been discussed and described above and are similar to those well known and understood by those of ordinary skill in the relevant arts. As such, these elements of the exemplary HAN File Server 10 file mechanisms will not be discussed in detail herein except as necessary for a complete understanding of the present invention. The following discussions will instead focus on the fault handling mechanisms of the HAN Filer Server 10 file mechansisms and, in particular, on the fault handling mechansisms related to operation of the upper level file system elements of the HAN File Server 10.

As described, the third component of the HAN File Server 10 file mechanisms is comprised of mirroring mechanisms that provide protection against the loss of data resulting from the loss of any HAN File Server 10 component. As illustrated in FIG. 3, the mirroring mechanisms include, for each Blade 14, a Cache Mirror Mechanism (CMirror) 54C residing in the BEP 44B of the Blade 14 and a Log Mirror Mechanism (LMirror) 54L residing in the BEP 40B of the opposite, peer Blade 14. CMirror 54M is a continuous operating cache mirroring mechanism communicating with WCache 50C of JFile 50 through Message 42. Log 50L, in turn, is mirrored on demand by the LMirror 54L residing in the BEP 44B of the peer Blade 14, communicating with the corresponding LogM 50M through the path including Message 42, BE BusSys 38O and Compute Blade Bus 30, so that all data changes to the file systems through one of Blades 14A or 14B are reflected to the other of Blades 14A and 14B before being acknowledged to the client. In this regard, and in the presently preferred embodiment, the mirroring of a Log 50L is performed during the processing of each file system transaction, so that the latency of the transaction log mirroring is masked to the extent possible by the execution of the actual file system transaction. Lastly, it will be understood that the Disk Drive 18 file system, control, monitoring and data recovery/reconstruction functions supported.and provided by RAIDF 46F are additionally a part of the HAN File Server 10 data protection mechanisms, using data mirroring methods internal to Storage Sub-System 12.

As will be described further in following discussions, these mirroring mechanisms therefore support a number of alternative methods for dealing with a failure in a Blade 14, depending upon the type of failure. For example, in the event of a failure of one Blade 14 the surviving Blade 14 may read the stored file transactions stored in its LMirror 54L back to the failed Blade 14 when the failed Blade 14 is restored to operation, whereupon any lost file transactions may be re-executed and restored by the restored Blade 14. In other methods, and as will be described further with regard to Network 34 fail-over mechanisms of the Blades 14, file transactions directed to the failed Blade 14 may be redirected to the surviving Blade 14 through the either the Blade Bus 30 path between the Blades 14 or by redirection of the clients to the surviving Blade 14 by means of the Network 34 fail-over mechanisms of the Blades 14. The surviving Blade 14 will thereby assume execution of file transactions directed to the failed Blade 14. As described below, the surviving Blade 14 may, as part of this operation, either re-execute and and recover any lost file transactions of the failed Blade 14 by re-executing the file transactions from the failed Blade 14 that are stored in its LMirror 54L, or may read the file transactions back to the failed Blade 14 after the failed Blade 14 is restored to operation.surviving re-execute the file transactions residing in the LMirror 54L in the surviving Blade 14 that have been mirrored from the failed Blade 14, thereby recreating the state of the file system on the failed Blade 14 at the time of the failure, so that no data is lost from the failed Blade 14 for acknowledged transactions.

3. Operation of the Communications Mechanisms of a HAN File Server 10 (FIGS. 1, 2, and 3)

As illustrated in FIGS. 1, 2 and 3, the communications mechanisms of a HAN File Server 10 incorporating the present invention may be regarded as comprised of three levels or layers of communications mechanisms. For purposes of the present descriptions, the uppermost level is comprised of Network 34 related communications mechanisms for communication of file transactions between Clients 34C and the client file system structures supported by the HAN File Server 10 and the related communications failure handling mechanisms. The middle layer of communications mechanisms includes communications mechanisms supporting communications between Blades 14A and 14B, such Blade Bus 30 and Messages 42, and the related communications failure handling mechanisms. The lowest layer of communications mechanisms includes the paths and mechanisms for communication between Blades 14 and Storage Sub-System 12 and between the elements of Storage Sub-System 12, which have been discussed above and will not be discussed further except as necessary for an understanding of the present invention.

First considering the upper level or layer of communications mechanisms of a HAN File Server 10, as illustrated in FIG. 3, the Network Mechanisms (Network) 48 residing on the FEP 44F of each of Blades 14A and 14B include a Network Stack Operating System (NetSOS) 56 that includes a TCP/IP Protocol Stack (TCP/IP Stack) 58, and Network Device Drivers (NetDDs) 60 wherein, as described below, these mechanisms are enhanced to accommodate and deal with single Port 34P failures, Network 34 failures and entire Blade 14 failures. In this regard, and as discussed elsewhere herein, Networks 34 may be comprised, for example, of local area networks (LANs), wide area networks (WANs), direct processor connections or buses, fiber optic links, or any combination thereof, and NETDEVs 38T and NetDDs 60 will be implemented accordingly.

As also shown in FIG. 3, and as discussed further below with respect to the high availability communications mechanisms of a HAN File Server 10, each Network 48 further includes a Client Routing Table (CRT) 48A for storing Client Routing Entries (CREs) 48E containing routing and address information pertaining to the Clients 34C supported by the Blade 14 and CREs 48E of Clients 34C supported by the opposite, peer Blade 14. As will be understood by those of ordinary skill in the relevant arts, CREs 48E may be used by Network 48 to direct file transaction communications to a given Client 34C and, if necessary, to identify or confirm file transaction communications received from those Clients 34C assigned to a Blade 14. As indicated, each Network 48 will also include a Blade Routing Table (BRT) 48B containing address and routing information relating to the Network 34 communications paths accessible to and shared by Blades 14 and thereby forming potential communications paths between Blades 14. In a typical and presently preferred implementation of Networks 48, CRT 48A and BRT 48B information is communicated between Blades 14A and 14B through the communication path including Blade Bus 30, but may be provided to each Blade 14 through, for example, Network 34M.

First considering the general operation of the Network 34 communications mechanisms of a HAN File Server 10 and referring to FIGS. 1 and 2, each Blade 14 of a HAN File Server 10 suports a plurality of Ports 34P connecting to and communicating with Networks 34. For example, in a present implementation each Blade 14 supports a total of five Ports 34P wherein four Ports 34P are connected to Networks 34N to service Clients 34C and one port is reserved for management of the HAN File Server 10 and is connected to a management Network 34M. As illustrated, corresponding Ports 34P on each of Blades 14A and 14B are connected to the same Networks 34, so that each Network 34 is provided with a connection, through matching Ports 34P, to each of Blades 14A and 14B. In the present example, the Ports 34P of the HAN File Server 10 are configured with 10 different IP addresses, that is, one address for each port, with the Ports 34P of each corresponding pair of Ports 34P of the Blades 14 being attached to the same Network 34, so that each Network 34 may address the HAN File Server 10 through two addresses, one to each of Blades 14A and 14B. The Ports 34P to which each client of a HAN File Server 10 are assigned are determined within each client, by an ARP table residing in the client, as is conventional in the art and as will be well understood by those of ordinary skill in the relevant arts. In addition and as also represented in FIG. 2, Clients 34C can access the HAN File Server 10 either through one of the directly connected Network 34 connections or through the optional Router 34R if the HAN File Server 10 is configured with a default route or is provided with a routing protocol such as RIP or OSP. In alternate implementations of a HAN File Server 10, each Client 34C may be connected to Ports 34P of the HAN File Server 10 through multiple Networks 34, and the Networks 34 may utilize different technologies, such as local area networks (LANs), wide area networks (WANs), direct processor connections or buses, fiber optic links, or any combination thereof, with appropriatge adaptations of the ARP tables of Clients 34C and the HAN File Server 10, which are described further below.

As represented in FIG. 3, the Network 48 mechanisms residing on each FEP 44F of each of Blades 14A and 14B further include CIFS 62 and FNS 64 network file systems, and other necessary services. These additional services, which are not shown explicitly in FIG. 3, include:

NETBIOS—a Microsoft/IBM/Intel protocol used by PC clients to access remote resources. One of the key features of this protocol is to resolve resource names into transport addresses wherein a resource is a component of a UNC name which is used by the client to identify the share, that is, a resource path, wherein in the HAN File Server 10 the resource represents the file server. NETBIOS also provides CIFS 62 packet framing, and the HAN File Server 10 uses NETBIOS over TCP/IP as defined in RFC1001 and RFC1002;

SNMP—the Simple Network Management Protocol, that provides the HAN File Server 10 with a process, called the agent, that provides information about the system and provides the ability to send traps when interesting events occur;

SMTP—the Simple Mail Transport Protocol used by the HAN File Server 10 to send email messages when interesting events occur;

NIS—the Sun Microsystems Network Information Service that provides a protocol used by NFS servers to identify the user ID's used to control access to NFS file systems; and, ROUTED or GATED—a dynamic routing protocol that may be used to discover networking topology in support of clients that are running behind a router such as Router 34R. In the present implementation of a HAN File Server 10 this protocol operates in the passive mode to monitor routing information. In alternate implementations, the user may install or designate a default route during system initialization.

For purposes of description of the present invention, it will be understood by those of ordinary skill in the relevant arts that in normal operation of a HAN File Server 10 the elements of each Network 48, that is, NetSOS 56, TCP/IP Stack 58, NetDDs 60 and CRT 48A, operate in the conventional manner well understood by those of ordinary skill in the arts to perform network communications operations between Clients 34C and the HAN File Server 10. As such, these aspects of HAN File Server 10 and a Network 48 will not be discussed in further detail and the following discussions will focus on the high availability network related communications mechanisms of a HAN File Server 10.

4. HAN File Server 10 Communications Fault Handling Mechanisms (FIGS. 1, 2 and 3)

a. Network Communications Failure Mechanisms

It will be recognized and understood by those of ordinary skill in the relevant arts that while a communications or connectivity failure is readily detected, the determination of what component has failed, and thus the appropriate corrective measures, are difficult and complex. For example, possible sources of failure include, but are not limited to, a failed Port 34P, a failed link between a Port 34P and a hub or switch of the Network 34, or a failed or erronous partition in the network between the Blades 14. A HAN File Server 10, however, provides IP network communications services capable of dealing with failures of one or more Network 34 interfaces and different types of Network 34 failures, as well as Blade 14 failures and, in order to provide the server system with the capability of degrading incrementally for various failures, implements a number of cooperative or complementary mechanisms to deal with the different classes or types of failure. For example, in the instance of a Port 34P interface failure in a Blade 14, the HAN File Server 10 may utilize the Compute Blade Bus 30 connection between Blades 14A and 14B to forward network traffic from the functioning corresponding Port 34P on the peer Blade 14 to the Blade 14 in which the Port 34P failed. This facility avoids the necessity of failing the entire Blade 14 as a result of a failure of a single network Port 34P therein and the consequent need to move the file systems supported by that Blade 14. It will be recognized that this facility also accommodates multiple network Port 34P failures on either or both of the Blades 14 as long as the failures occur on different Networks 34, that is, so long as failures to not occur on both of the corresponding pairs of Ports 34P on Blades 14. So long as there is at least one Port 34P on one of the Blades 14 for each Network 34, the clients will see no failures.

The high availability communications mechanisms of a HAN File Server 10 are provided by a Communications Fail-Over Mechanism (CFail) 66 residing in each Blade 14 domain and including separately operating but cooperative mechanisms for communications fault handling with respect to the mechanisms of the Network 48 of each Blade 14 and the Message 42 mechanisms of Blades 14A and 14BA.

First considering the functions and operations of CFail 66 with with respect to Network 48, that is, communications between Clients 34C and the Control/Processor Sub-System 14 domain, a CFail 66 may perform an operation referred to as IP Takeover whereby the failed Network 34 services associated with a Blade 14 are moved to the corresponding non-failed Ports 34P of the opposite, peer Blade 14 and, as described below, are routed through alternate paths through Blades 14. As illustrated in FIG. 3, each CFail 66 includes a Communications Monitoring Process/Protocol Mechanism (CMonitor) 66C residing in the FEP 44F of the Blade 14 that operates to monitor and coordinate all communications functions of Blades 14, including operations of the NetSOS 56 of Blades 14A and 14B, communications through Ports 34P and Networks 34 and communications through the Blade Bus 30 path between Blades 14A and 14B. For purposes of monitoring and fault detection of communications through Ports 34P and Networks 34, each CFail 66 includes a SLIP Interface (SLIP) 66S that operates through the Network 48 and Ports 34P of the Blade 14 in which it resides to exchange Network Coordination Packets (NCPacks) 66P with the opposite, peer Blade 14. NCPacks 66P contain, for example, network activity coordination information and notifications, and are used by CMonitor 66C to detect and identify failed Ports 34P. In particular, each SLIP 66S periodically transmits a beacon NCPack 66P to the SLIP 66S and CMonitor 66C of the opposite, peer Blade 14 through each Network 34 path between the Blades 14. A Network 34 path between the Blades 14 is detected and considered as failed if the CMonitor 66C of a Blade 14 does not receive a beacon NCPack 66P from the opposite, peer Blade 14 through the path during a predetermined failure detection interval, and it is assumed that the failure has occured in the Port 34P interface of the opposite Blade 14.

The predetermined failure detection interval is longer than the interval between NCPack 66P transmissions and is typically less than the CIFS client time-out interval. In an exemplary implementation, this interval may be approximately 5 seconds for a CIFS time-out interval of 15 seconds.

As shown in FIG. 3, each CFail 66 includes an ARP Response Generator (ARPGen) 66G that is responsive to CMonitor 66C to generate unsolicited ARP Responses 66R and a Path Manager (PM) 66M that manages the contents of CREs 48E residing in CRT 48A in accordance with the operations of CFails 66 to manage the redirection of Client 34C communications by Network 48. When the CMonitor 66C of a Blade 14 determines a communications path failure in the peer Blade 14, such as a failure in a Port 34P interface, that information is passed to the ARPGen 66G, which generates a corresponding unsolicited ARP Response 66R to the clients connected from the Port 34P associated with the failure, using the information stored in ARP Table 66T to identify the network addresses of the Clients 34C assigned to or associated with the failure. An ARP Response 66R operates to modify or re-write the information in the ARP tables of the target Clients 34C to re-direct the Clients 34C to the working Port 34P of the pair of corresponding Ports 34P, that is, the Port 34P of the CFail 66 generating the ARP Response 66R. More specifically, an unsolicited ARP Response 66R transmitted by an ARPGen 66G attempts to modify or rewrite the ARP table residing in each such Client 34C to direct communications from those Clients 34C to the corresponding Port 34P of the Blade 14 containing the ARPGen 66G transmitting the ARP Response 66R. Each CFail 66 thereby attempts to redirect the Clients 34C of the failed communications path to the corresponding Port 34P of the Blade 14 in which the CFail 66 resides, thereby resulting, as will be described below, in a redirection of the clients communicating with the failed Port 34P to the functioning corresponding Port 34P of the Blade 14 containing the functioning Port 34P.

In addition, the PM66P of each Blade 14 responds to the operations of the CMonitor 66C and the generation of one or more ARP Responses 66R by the ARPGen 66G by modifying the CREs 48E of CRT 48A corresponding to the Clients 34C that are the target of the ARP Responses 66R. In particular, PM 66M writes a Failed Entry (FE) 48F into the CRE 48E corresponding to each Client 34C to which an ARP Response 66R has been directed, indicating that the communications of the corresponding Client 48C have been redirected, and sets a Passthrough Field (PF) 48P in the CRT 48A to indicate to each Network 48 that the Blades 14 are operating in a mode.

Thereafter, and upon receiving through its own Ports 34P any communication from a Client 34C that is directed to the peer Blade 14, that is, to a client file system supported on the peer Blade 14, the Network 48 will check PF 48P to determine whether the passthrough mode of operation is in effect. If the passthrough mode is in effect, the Network 48 will direct the communication to the peer Blade 14 through the passthrough path comprised of the Blade Bus 30 path between the BEPs 44B of the Blades 14. In addition, and as a result of a redirection as just described, a Network 48 may receive a communication through the Blade Bus 30 passthrough path that was directed to a Port 34P in its Blade 14, but which was redirected through the Blade Bus 30 passthrough path by redirection through the other Blade 14. In such instances, CMonitor 66C and PM 66M will respond to the receiving of such a communication by the Network 48 by modifying the CRE 48E corresponding to the Client 34C that was the source of the communication to route communications to that Client 34C through the Blade Bus 30 passthrough path and the peer Blade 14, thereby completing the redirection of communications in both directions along the path to and from the affected Clients 34C.

It has been described above that in alternate implementations of a HAN File Server 10, each Client 34C may be connected to Ports 34P of the HAN File Server 10 through multiple Networks 34, and the Networks 34 may utilize different technologies, such as local area networks (LANs), wide area networks (WANs), direct processor connections or buses, fiber optic links, or any combination thereof. In these implementations, the CFail 66 mechanisms will operate as described above with regard to detected failures of Network 34 communications, but may additionally select among the available and functioning alternate Network 34 paths between a Client 34C and a Blade 14 having a Port 34P failure, as well as redirecting Client 34C communications to the surviving Blade 14. In this implementation, the CFail 66 mechanisms will modify the Client 34C ARP tables and CREs 48E as described above to redirect the Client 34C communications, but will select among additional options when selecting an alternate path.

It must be noted with regard to IP Takeover operations as described above that the CFail 66 mechanisms of a HAN File Server 10 do not attempt to identify the location or cause of a connection between Networks 34 and Blades 14. Each CFail 66 instead assumes that the failure has occurred in the Port 34P interface of the opposite Blade 14 and initiates an IP Takeover operation accordingly, so that IP Takeover operations for a given communications path may be executed by Blades 14A and 14B concurrently. Concurrent IP Takeover operations by Blades 14A and 14B will not conflict, however, in the present invention. That is, and for example, if the IP Takeover operations are a result of a failure in a Port 34P interface of one of Blades 14A and 14B or in a Network 34 link to one of Blades 14A and 14B, the CFail 66 of the Blade 14 in which the failure is associated will not be able to communicate its ARP Response 66R to the Clients 34C connected through that Port 34P or Network 34 link. As a consequence, the CFail 66 of the Blade 14 associated with the failure will be unable to redirect the corresponding Client 34C traffic to its Blade 14. The CFail 66 of the opposite Blade 14, however, that is, of the Blade 14 not associated with the failure, will succeed in transmitting its ARP Response 66R to the Clients 34C associated with the failed path and thereby in redirectingthe corresponding Client 34C traffic to its Blade 14. In the event of a failure arising from a partition in the network, both Port 34P interfaces may "bridge" the network partition through the Blade Bus 30 communication path between Blades 14A and 14B, as will be described below, so that, as a result, all Clients 34C will be able to communicate with either of Blades 14A and 14B.

Finally, in the event of a complete failure of either Blade 14A and 14B, IP Takeover operations are performed through CFails 66 in the manner described above with respect to the assumption of the services of a failed Port 34P by the corresponding surviving Port 34P of the other Blade 14, except that the network services of all of the Ports 34P of the failed Blade 14 are assumed by the corresponding Ports 34P of the surviving Blade 14. It will be understood by those of ordinary skill in the relevant arts, however, that when there is a complete failure of a Blade 14, the TCP connections of the client served by the failed Blade 14 are broken, and must be re-established after the IP Takeover is complete, after which the services that were available on the failed Blade 14 are available on the surviving Blade 14 and the clients of the failed Blade 14 can re-establish the TCP connections, but to the surviving Blade 14.

Lastly with respect to the operation of the IP Takeover mechanisms described above, it will be understood that the Network 34 related communications operations supported by a HAN File Server 10 includes broadcast communications as required, for example, by the NetBIOS mechanisms of Network 48, as well as the point to point, or Client 34C to HAN File Server 10, communications discussed above. As will be understood by those of ordinary skill in the relevant arts, broadcast communications differ from point to point communications in being directed to a plurality of recipients, rather than to a specific recipient but, when the Blades 14 are operating in the passthrough mode, are otherwise managed in a manner similar to Client 34C communications. In this case, a Network 48 receiving a broadcast communication will check whether the Blades are operating in passthrough mode, as described above, and, if so, will forward each such broadcast communication to the Network 48 of the opposite Blade 14 through the Blade Bus 30 passthrough path, whereupon the communication will be treated by the other Network 48 in the same manner as a broadcast communication that was received directly.

Lastly with regard to the above, it is known and understood by those of ordinary skill in the arts that the industry standard CIFS specification does not describe or specify the effects of a dropped connection on an application running on a client system. Experience, experimentation and application documentation indicates that the effects of a dropped TCP connection on an application is application dependent and that each handles the failure differently. For example, certain applications direct that clients should retry the operation using the TCP connection and some applications automatically retry the operation, while others report a failure back to the user network port failover mechanism. As such, the presently preferred implementation of network port failover mechanism incorporates functions to implement these features, including functions in the NetDDs 60 controlling the Ports 34P to support multiple IP addresses, thereby allowing each Port 34P to respond to multiple addresses, and the functionality necessary to transfer IP addresses from a failed Blade 14 and instantiate the IP addresses on the surviving Blade 14. The network port failover mechanism also includes functions, which have been discussed above, to generate and transmit unsolicited ARP Response 66Rs to clients connected to failed Ports 34P to change the IP addresses in the clients ARP tables to point to the new Ports 34P, to interface with availability and failure monitoring functions in other subsystems to know when a complete Blade 14 failure has occurred, and to implement NetBIOS name resolution for the failed Blade 14 resource name.

It will therefore be apparent that the CFail 66 mechanisms of a HAN File Server 10 will be capable of sustaining or restoring communications between Clients 34C and the Blades 14 of the HAN File Server 10 regardless of the network level at which a failure occurs, including at the sub-network level within the Port 34P interfaces of Blades 14A and 14B. The sole requirement is that there be a functioning network communications path and network interface for each Network 34 on at least one of Blades 14A or 14B. The CFail 66 mechanisms of the present invention thereby avoid the complex mechanisms and procedures necessary to identify and isolate the source and cause of network communications failures that are typical of the prior art, while also avoiding the complex mechanisms and operations, also typical of the prior art, that are necessary to coordinate, synchronize and manage potentially conflicting fault management operations.

b. Blade 14/Blade 14 Communications and Fault Handling Mechanisms

It has been described above that the middle layer of communications mechanisms of a HAN File Server 10 includes the communications mechanisms supporting communications between and within the Blade 14A and 14B domains of the Control/Processor Sub-System 14 domain, such as Blade Bus 30 and Messages 42. As described, and for example, the Blade Bus 30 path and Messages 42 are used for a range of HAN File Server 10 administrative and management communications between Blades 14, as a segment of the file transaction processing path in the event of a communications Takeover operation, and in CMirror 54M and LMirror 54L operations.

As discussed and as illustrated in FIG. 2, the Blade Bus 30 communication path between Blades 14 is comprised of Blade Bus 30 and, in each Blade 14, the BE BusSys 38O resident in BEP 44B, which includes such elements as Ser-Des's 38R, FCCs 38Q, P-P Bridges 38H, MCHs 38C and Processors 36A. Although not explicitly shown in FIG. 2, it will be understood that BE BusSys's 38O also include BE BusSys 38O control and communications mechanisms executing in Processor 36A, that is, in BEP 44B, that operate, in general, in the manner well understood by those of ordinary skill in the relevant arts to execute communications operations through BE BusSys's 38O and Blade Bus 30. It will also be understood that Processors 36A and 36B, that is, of the FEP 44F and BEP 44B of each Blade 14, also execute Message 42 control and communications mechanisms, which are not shown explicitly in FIGS. 2 or 3, that operate, in general, in the manner well understood by those of ordinary skill in the relevant arts to execute communications operations through Message 42.

Messages 42, in turn, which provides communications between BEPs 44B and FEPs 44A, are comprised of a shared message communications space in the Memory 38A of each Blade 14, and messaging mechanisms executing in Processors 36A and 36B that, in general, operate in the manner well understood by those of ordinary skill in the relevant arts to execute communications operations through Messages 42.

As indicated in FIG. 3, CFail 66 includes a fault handing mechanism that is separate and independent from SLIP 66S, CMonitor 66C and ARPGen 66G, which function in association with communications into and from the Control/Processor Sub-System 14 domain, for fault handling with respect to communications between and within the Blade 14A and 14B domains of the Control/Processor Sub-System 14 domain, that is. As shown therein, the inter-Blade 14 domain communications fault handling mechanism of CFail 66 includes a Blade Communications Monitor (BMonitor) 66B that monitors the operation of the Blade Bus 30 communication link between Blades 14A and 14B, which includes Blade Bus 30 and the BE BusSys 38O of the Blade 14, and the operation of the Message 42 of the Blade 14, although this connection is not shown explicitly in FIG. 3. First considering Blade Bus 30, in the event of a failure for any reason of the Blade Bus 30 communication path between Blades 14, that is, in Blade Bus 30 or the BE BusSys 38O, this failure will be detected by BMonitor 66B, typically by notification from the BE BusSys 38O control mechanisms executing in Processors 36A that an attempted communication through the Blade Bus 30 path has not been acknowledged as received.

In the event of a failure of the Blade Bus 30 communication path, BMonitor 66B will read Blade Routing Table (BRT) 48P, in which is stored information regarding the available communicating routing paths between Blades 14A and 14B. The path information stored therein will, for example, include routing information for communications through Blade Bus 30, but also routing information for the available Networks 34 paths between the Blades 14A and 14B. It will be noted that BRT 48B may be stored in association with CFail 66 but, as shown in FIG. 3, in the presently preferred embodiments of Blades 14 BRT 48B resides in association with Network 48 as the routing path information relevant to Networks 34 is readily available and accessible to Network 48 in the normal operations of Network 48, such as in constructing CRT 48A. BMONITOR 66B will read the routing information concerning the available communications paths between the Blades 14, excluding the Blade Bus 30 path becuase of the failure of this path, and will select an available Network 34 path between the Networks 48 of the Blades 14 to be used in replacement or substitution for the Blade Bus 30 path. In this regard, it must be noted that BMONITOR 66B modifies the contents of BRT 48B during all IP Takeover operations in the same manner and currently with PM 66M's modification of the CREs 48E of CRT 48A to indicate non-functioning Network 34 paths between Blades 14, so that the replacement path for the Blade Bus 30 path is selected from only functioning Network 34 paths.

BMonitor 66B will then issue a notification to the BE BusSys 38O and Message 42 control and communications mechanisms executing in FEP 44F and BEP 44B that will redirect all communications that would be routed to the Blade Bus 30 path, either directly by BEP 44B or indirectly through Message 42 by FEP 44F, to Network 48 and the Networks 34 path selected by PM 66M.

In the event of a failure of the Blade Bus 30 communication path between Blades 14 for any reason, therefore, the CMonitor 66C and BMonitor 66B mechanisms of CFail 66 will operate to find and employ an alternate communications path for Blade 14 to Blade 14 communications through Networks 34. In this regard, it should again be noted that the CFail 66 mechanisms do not attempt to identify the location or cause of a failure and thereby avoid the complex mechanisms and procedures typically necessary to identify and isolate the source of a failure, and the complex mechanisms and operations typically necessary to coordinate, synchronize and manage potentially conflicting fault management operations.

It must also be noted that the communications failure handling mechanisms of a HAN File Server 10 operate separately and independently of one another, thus again avoiding the use of complex mechanisms and operations to coordinate, synchronize and manage potentially conflicting fault management operations, but cooperatively in handling multiple sources of failure or multiple failures. For example, the operations executed by the CFail 66 Networks 34 failure mechanisms, that is, the CMonitor 66C related mechansisms, are executed independently of the operations executed by the CFail 66 Blade Bus 30 failure mechanisms, that is, the BMonitor 66B related mechansisms, but are executed in a functionally cooperative manner to maintain communications between the Clients 34C and Blades 14 and between Blades 14. Communications are maintained regardless of the sources of the failures or sequence of failures, so long as there is a single functioning Networks 34 path between Blades 14 and to each Client 34C that are executed in the event of a Blade Bus 30 path failure.

To illustrate, a Networks 34 failure associated with a first one of Blades 14 will result, as described above, result in the redirection of Client 34C communications through the second Blade 14 and to the first Blade 14 through the Blade Bus 30 link between Blades 14 by the CFail 66 Networks 34 failure mechansims. A subsequent failure of the Blade Bus 30 link will then result in the Client 34 communications that have been redirected through the second Blade 14 and the Blade Bus 30 link in being again redirected from the second Blade 14 and back to the first Blade 14 through an alternate and functioning Networks 34 path between the second and first Blades 14 by the CFail 66 Blade Bus 30 failure mechanisms.

In a further example, if the first failure occurred in the Blade Bus 30 link the communications between the Blades 14 would be redirected, as described above, to an alternate functioning path between the Blades 14 through Networks 34 by the CFail 66 Blade Bus 30 failure mechanisms. If a subsequent failure occurred in this alternate Networks 34 path, this failure would be detected as a Networks 34 related failure and the CFail 66 Networks 34 failure mechanisms of the Blades 14 would first attempt to route the previously redirected communications between Blades 14 through the Bus Blade 30 link. The CFail 66 Blade Bus 30 failure mechanisms would, however, and because the Blade Bus 30 link is inoperative, redirect the previously redirected communications through an available and functioning alternate Networks 34 path between the Blades 14.

It will therefore be apparent that various combinations and sequences of the separate and independent operations executed by the CFail 66 Networks 34 and Blade Bus 30 failure mechanisms may be executed for any combination or sequence of Networks 34 and Blade Bus 30 failures to maintain communications between Clients 34C and the Blades 14 and between the Blades 14. Again, communications will maintained regardless of the sources of the failures or sequence of failures, so long as there is a single functioning Networks 34 path between Blades 14 and to each Client 34C that are executed in the event of a Blade Bus 30 path failure.

Lastly in this regard, it must be noted that a failure may occur in the Message 42 link between the FEP 44F and BEP 44B of a Blade 14. In many instances, this will be the result of a failure that will result in failure of the entire Blade 14, but in some instances the failure may be limited to the Message 42 mechanisms. In the case of a failure limited to the Message 42 mechansisms, the FEP 44F of the Blade 14 in which the failure occurred will not be able to communicate with the BEP 44B of the Blade 14 or with the opposing Blade 14, and the BEP 44B will not be able to communicate with the FEP 44B of the Blade but will be able to communicate with the BEP 44B and FEP 44F of the opposing Blade 14 through the Blade Bus 30 link between the Blades 14.

In a further implementation of the present invention, therefore, the BMonitor 66B of the Blade 14 in which the Message 42 failure occurred will detect an apparent failure of Blade Bus 30 with respect to the FEP 44F, but will not detect a failure of Blade Bus 30 with respect to the BEP 44B. The BMonitor 66B and CMonitor 66C mechanisms of this Blade 14 will thereby redirect all communications from the FEP 44P to the BEP 44B or to the opposing Blade 14 through a Networks 34 path selected by PM 66 and will redirect all communications from the BEP 44B to the FEP 44F to a route through Blade Bus 30 and the Networks 34 path selected for the FEP 44F, but will not redirect BEP 44B communications through Blade Bus 30.

In the Blade 14 in which the failure did not occur, the BMonitor 66B mechanisms will detect an apparent Blade Bus 30 path failure with respect to communications to the FEP 44P of the Blade 14 in which the Message 42 failure occurred but will not detect a Blade Bus 30 path failure with respect to communications to the BEP 44B of that Blade 14. The BMonitor 66B and CMonitor 66C mechanisms of this Blade 44 will thereby redirect all communications directed to the FEP 44F of the opposing Blade 14 through an alternate Networks 34 path, in the manner described, but will not redirect communications directed to the BEP 44B of the opposing Blade 14.

c. Storage Sub-System 12/Blade 14 Fault Handling Mechanisms

As described above, the lowest level of fault handling mechanisms of a HAN File Server 10 includes the communications path structures of Storage Sub-System 12 and the RAIDF 46F mechanisms implemented by RAID 46. RAID file functions are well known and understood by those of ordinary skill in the relevant arts and, as such, will be discussed herein only as necessary for understanding of the present invention. The following will accordingly primarily focus upon the communications path structures within Storage Sub-System 12 and between Sub-System 12 and Blades 14.

As shown in FIG. 1 and as also describe above, Storage Sub-System 12 includes a Drive Bank 16 comprised of a plurality of hard Disk Drives 18, each of which is bidirectionally read/write accessed through dual Storage Loop Modules 20A and 20B. Storage Loop Modules 20A and 20B respectively include MUXBANKs 22A and 22B, each of which includes a plurality of MUXs 24 and Loop Controllers 26A and 26B wherein MUXs 24 and Loop Controller 26 of each Loop Controller Module 20 are bidirectionally interconnected through MUX Loop Buses 28A and 28B. AS shown, MUXBANKs 22A and 22B each include a MUX 24D corresponding to and connected to a corresponding one of Disk Drives 18, so that each Disk Drive 18 of Drive Bank 16 is bidirectionally read/write connected to a corresponding MUX 24D in each of MUXBANKs 20A and 20B. Each of MUXBANKs 20A and 20B is further bidirectionally connected with the corresponding one of Compute Blades 14A and 14B through MUX 24CA and MUX 24CB, and Compute Blades 14A and 14B are bidirectionally connected through Blade Bus 30.

Each of Disk Drives 18 is therefore bidirectionally connected to a MUX 24D of MUX Bank 22A and a MUX 24 of MUX Bank 22B and the MUXs 24 of MUX Bank 20A are interconnected through a Loop Bus 26A while the MUXs 24 of MUX Bank 22B are interconnected through a Loop Bus 26B, so that each Disk Drive 18 is accessible through both Loop Bus 26A and Loop Bus 26B. In addition, Processor Blade 14A bidirectionally communicates with Loop Bus 26A while Processor Blade 14B bidirectionally communicates Loop Bus 26B and Processor Blades 14A and 14B are directly interconnected and communicate through Blade Loop (Blade) Bus 30.

It will therefore be recognized that the lower level communication fault handling mechanism within Storage Sub-System 12 is essentially a passive path structure providing multiple, redundant access paths between each Disk Drive 18 and Processor Blades 14A and 14B. As such, Processor Blades 14A and 14B may bidirectionally communicate with any of Disk Drives 18, either directly through their associated Loop Bus 26 or indirectly through the other of Processor Blades 14, and may communicate directly with each other, in the event of a failure in one or more communications paths within Storage Sub-System 12. The fault handling mechanisms for faults occurring within one or more Disk Drives 18, in turn, is comprised of the RAIDF 48F mechanisms discussed herein above.

It will also be recognized that the passive path structure of Storage Sub-System 12 operates separately and independently of the communications mechanisms and the CFail 66 Networks 34 and Blade Bus 30 failure mechanisms of Blades 14, but cooperatively with the mechanisms of Blades 14 to ensure communications between Clients 34C and the Disk Drives 18 in which the file systems of Clients 34C reside. Again, these mechanisms a high level of file system availability while avoiding the use of complex fault detection, identification and isolation mechanisms and the use of complex fault management coordination, synchronization and managment mechanisms.

5. File Transaction Fault Handling Mechanisms of a HAN File Server 10 and Interoperation with the Communications Failure Handling Mechanisms of a HAN File Server 10 (FIGS. 1, 2 and 3)

It has been described herein above that the presently preferred embodiment of a HAN File Server 10 includes a number high availability mechanisms, that is, mechanisms to allow the HAN File Server 10 to continue to provide uninterrupted file server services to clients in the event of a failure of one or more components of the HAN File Server 10. Many of these mechanisms are typical of those currently used in the present art, such as the basic RAIDF 46F functions, and will be well understood by those of ordinary skill in the relevant arts and thus will not be discussed in detail herein unless relevant to the present invention.

In general, however, in the event of the failure of a HAN File Server 10 component, the surviving components in the HAN File Server 10 will, by operation of the high availability mechanisms, take over the tasks and services performed by the failed component and continue to provide those services. It will be appreciated and understood by those of ordinary skill in the relevant arts that there are a number of aspects to the operation of such high availability mechanisms, and that such mechanisms are required to execute several operations in order to accomplish these functions. For example, the high availability mechanisms are required to identify that a component has failed, to transfer or move the resources or functions from the failed components to the surviving components, to restore the state of the resources that were taken over in the surviving components so that the services and functions provided by the failed components are not visibly interrupted, to allow the replacement or correction of the failed component, and to transfer or move the resources back to the failed component after repair.

As has been described above with respect to the communications, file transaction and communications mechanisms of a HAN File Server 10 individually, and as will be described in further detail in following discussions, the high availablity mechanisms of a HAN File Server 10 of the present invention operate at a number of different functional levels of the HAN File Server 10. In general, a different group or type of operations and functions are performed at each functional level of a HAN File Server 10 and the high availability mechanisms differ accordingly and operate independently but cooperatively to provide a high level of server availability at each level and for the HAN File Server 10 as a system. The following will discuss the structure and operation of these mechanisms in further detail, and the interoperation of these mechanisms.

For example, the highest level of functionality in a HAN File Server 10 is the communications level that performs client communications tasks and services, that is, communications between the clients and the client file systems supported by the HAN File Server 10 through Networks 34.

The core functions of this communications level are provided by the mechanisms of Network 48 and the related components of the HAN File Server 10 and the high availability mechanisms at the communications level include fault detection mechanisms, such as CFail 66, and provide a number of different mechanisms for dealing with a communications level failure. For example, in the event of a failure in communications through one or more Ports 34P of one of Blades 14A and 14B, the CFail 66 of the peer Blade 14 will detect the failure and, in conjunction with Network 48, will redirect all communications between clients and the failed Ports 34P to the corresponding functioning Ports 34P of the peer Blade 14. In the peer Blade 14, the Network 48 therein will route the communications back to the JFile 50 of the Blade 14 having the failed Port 34P through Blade Bus 30, so that failed Ports 34P are bypassed through the Ports 34P of the peer Blade 14 and the interBlade 14 communication path comprised of Blade Bus 30 and the FEP 44F-BEP 44P communication path through Message 42. In this regard, and as will be discussed in the next following discussion of the high level file transaction mechanisms of a Blade 14, the high availability mechanisms of Network 48 interoperate with those of the high level file transaction mechanisms to deal with apparent Network 34 related communication failures that, in fact and for example, result from a failure of the JFile 50 of a Blade 14 or of the entire Blade 14.

The next level of functionality in a Blade 14 is comprised of the high level file transaction functions and services wherein the core functions and operations of the high level transaction functions are provided by JFile 50 and the related high level file mechanims. As described above, the high availability mechanisms at the high level file functions level of the HAN File Server 10 include WCache 50C with CMirror 54M and Log 50L with LMirror 54L and these mechanisms operate to deal with failures of the high level file mechanisms within a Blade 14. As described, WCache 50C operates in the conventional manner to cache data transactions and CMirror 54M allows the contents of WCache 54C to be restored in the event of a failure in the FEP 44F affecting WCache 54C. Log 50L, in turn, operates with a Blade 14 to preserve a history of file transactions executed by a JFile 50. Log 50L thereby allows lost file transactions to be re-executed and restored in the event, for example, of a failure in JFile 50 or Storage Sub-System 12 resulting in a loss of file transactions before the transactions have been fully commited to stage storage in the Storage Sub-System 12.

The LMirror 54L mechanisms, however, do not operate within the Blade 14 in which the Logs 50L that the LMirrors 54L mirrors reside, but instead operate across the Blades 14 so that each LMirror 54L mirrors and preserves the contents of the Log 50L of the opposite, peer Blade 14. As a result, the LMirror 54L mechanisms preserve the contents of the opposite, peer Blade 14 Log 50L even in the event of a catastrophic failure of the opposite, peer Blade 14 and permit lost file transactions to be re-executed and restored in the failed Blade 14 when the failed Blade 14 is restored to service.

In addition, it should also be noted that the LMirror 54L mechanisms, by providing a resident history of possibly lost file transactions of a failed Blade 14 within the surviving Blade 14, also allow a surviving Blade 14 to assume support of the clients that been supported by a failed Blade 14. That is, the Network 48 and JFile 50 of the surviving Blade 14 may assume servicing of the clients previously supported by the failed Blade 14 by redirecting the clients of the failed Blade 14 to the surviving Blade 14, as described above with respect to the Network 48 mechansisms. In this process, the Network 48 mechanisms of the surviving Blade 14 will attempt to forward the file transactions directed to the opposite, peer Blade 14 to the JFile 50 of the opposite Blade 14 through the Blade Bus 30 connection between the BEPs 44B of the Blades 14. If the failed Blade 14 does not accept the forwarded file transactions, that is, the surviving Blade 14 does not receive acknowledgement of the forwarded file transaction from the failed Blade 14 through Blade Bus 14, as is conventional in such communications links, the Network 48 mechanisms of the surviving Blade 14 will direct the data transactions to the JFile 50 of the surviving Blade 14. The JFile 50 of the surviving Blade 14 may then assume the clients of the failed Blade 14 as new clients, but may use the file transaction history stored in the resident LMirror 54L to re-execute and reconstruct any lost file transactions of the failed Blade 14 to restore the file systems of the clients of the failed Blade 14 to their expected state, thereafter servicing these assumed clients as its own clients. In this regard, the JFile 50 of the surviving Blade 14 may determine that the "new" clients are clients transferred from the failed Blade 14 either by notification from Network 48, based upon the original address of the file transactions as being directed to the failed Blade 14, or by checking the contents of the resident LMirror 54L to determine whether any "new" client file transactions correlate with file transactions stored therein.

Finally, the lowest level of file transaction functionality in a HAN File Server 10 is comprised of the RAID 46 file transaction functions and services supported by RAID 46. It will be recognized that the RAIDF 46F functions in themselves operate independently of the upper level high availability mechanisms. It will also be recognized, however, that the communication level and high level file transaction mechanisms, in conjunction with the provision of alternate communications paths through, for example, dual Blades 14A and 14B, Loop Buses 26A and 26B, and MUX Loop Buses 28A and 28B, operate cooperatively with the RAIDF 46F functions to enhance accessability to Disk Drives 18.

It may be seen from the above descriptions, therefore, that the communication level and high level file transaction mechanisms and alternate communications paths provided in a HAN File Server 10 thereby cooperate with the RAIDF 46F functions to enhance the availability of file system shares, that is, storage space, to networked clients. It will also be seen that the communication level and high level file transaction mechanisms and alternate communications paths provided in a HAN File Server 10 achieve these results while avoiding the use of complex fault detection, identification and isolation mechanisms and the use of complex fault management coordination, synchronization and management mechanisms.

In summary, therefore, it may be seen from the above discussions that a number of different mechanisms are used to identify failed components, with the specific mechanism depending upon the component, the sub-system of the HAN File Server 10 in which it resides and the effects on the operation of the HAN File Server 10 of a failure of the component. For example, the RAIDM 46M functions monitor and detect failures in such components as the fans, power supplies, and similar components of Blades 14A and 14B, while the RAIDF 46F functions monitor, detect and correct or compensate for errors and failures in file system operations of Disk Drives 18. It will be recognized that a failure in many of the components monitored by the RAID 46 mechanisms do not compromise the availability of the data at the HAN File Server 10 level as a system, but must be detected and reported through the administrative interface so that action can be taken to repair the component. In a further example, the network management functions of a HAN File Server 10 monitor the state of Networks 34 and the Network 34 communication related components of the HAN File Server 10 and respond to failures in communications between the HAN File Server 10 and the clients of the HAN File Server 10 in ways appropriate to the specific failures. To monitor the network, the network management functions generate self-checks to test the HAN File Server 10's own network communications to determine whether it is communicating with the external network. If, for example, this self-check fails at any network path, then the communications supported by the failed network paths are failed over to another network path as described above. In yet another example, if the RAID 46 functions detect the failure of a Blade 14, this failure is communicated to the file system functions as described above, so that the fail-over procedures can proceed at the file system level as appropriate level can proceed.

The next step in the failure handling process, that is, the movement of the failed resources to surviving resources, is typically performed by reassigning the resource to a known surviving location. In the instance of a failure of a network function, the transfer will be to a previously identified a network adapter that is capable of assuming the functions of the failed device, again as described above, and, in the instance of a failed Blade 14, the peer Blade 14 will assume the file systems from the failed Blade 14.

The transfer of resources from a failed component to a surviving component may require an alteration of or modification to the operational state of the resource before the resource can be made available on the surviving component. For example, in the case of a failed network component, a new network address must be added to an existing adapter and, in the instance of a failure effecting the file system, such as a failure of a Blade 14, the transaction log is replayed to replace data that may have been lost in the failure.

As described previously, many of the components of the HAN File Server 10 are hot swappable, meaning that they can be removed from the HAN File Server 10 and replaced with a working component. Once the component been replaced, the resources that were taken over by the surviving components must be returned to the original component, that is, to the replacement for the original component. Recovery mechanisms in the appropriate sub-system, such as described above, will accordingly move the resources that were transferred to the surviving component back to the replacement component, a process that is typically initiated manually by the system administrator and at a time when the interruption in service is acceptable and manageable.

B. Detailed Description of the Present Invention
(FIGS. 1, 3, 4A and 4B)

As illustrated in FIG. 1 and as discussed above, a Storage Sub-System 12 of a HAN File Server 10 includes a plurality of Disk Drives 18 that are connected from Control/Processing Sub-System 14 through Storage Loop Modules 20A and 20B. The storage topology of Disk Drives 18 and reading and writing of information from and to Disk Drives 18 are controlled by the RAIDF 46F functions wherein, as described, RAID technology is a method for distributing redundant data and error correction information across a redundant array of disk drives to allow the recovery and reconstruction of data in the event of a Disk Drive 18 failure. In a present exemplary implementation of HAN File Server 10, Storage Sub-System 12 implemented as an industry standard RAID system wherein data and data recovery information, such as parity information or error correction codes, are spread over several disk drives according to a method referred to as "striping", wherein a "stripe" is the amount of information for which for which a given RAID system generates and stores parity. Because the data recovery information for a stripe is generated for and from all of the data in a stripe, a stripe is effectively the basic unit of data storage in a RAID striped system, that is, is stripe is always written as an entity. In a RAID 5 system, for example, as implemented in the present exemplary Storage Sub-System 12, uses five disk drives and a stripe is comprised of four blocks of information, with one block being stored on each of four of the disk drives and with a fifth block containing data recovery information for the four information blocks being stored in the fifth disk drive. It will also be understood by those of ordinary skill in the relevant arts, however, that not only may a greater or lesser number of disk drives be used, but a number of different RAID technologies may be implemented, and the data and the data recovery information may be distributed across a plurality of disk drives according to a number of schemes. In addition, and while the following description of an embodiment of the present invention describes the invention as implemented for disk drives, the present invention may equally be implemented for mass storage systems using other mass storage devices, such as read-write optical disk units and other forms of magnetic storage devices.

Figure 4A:
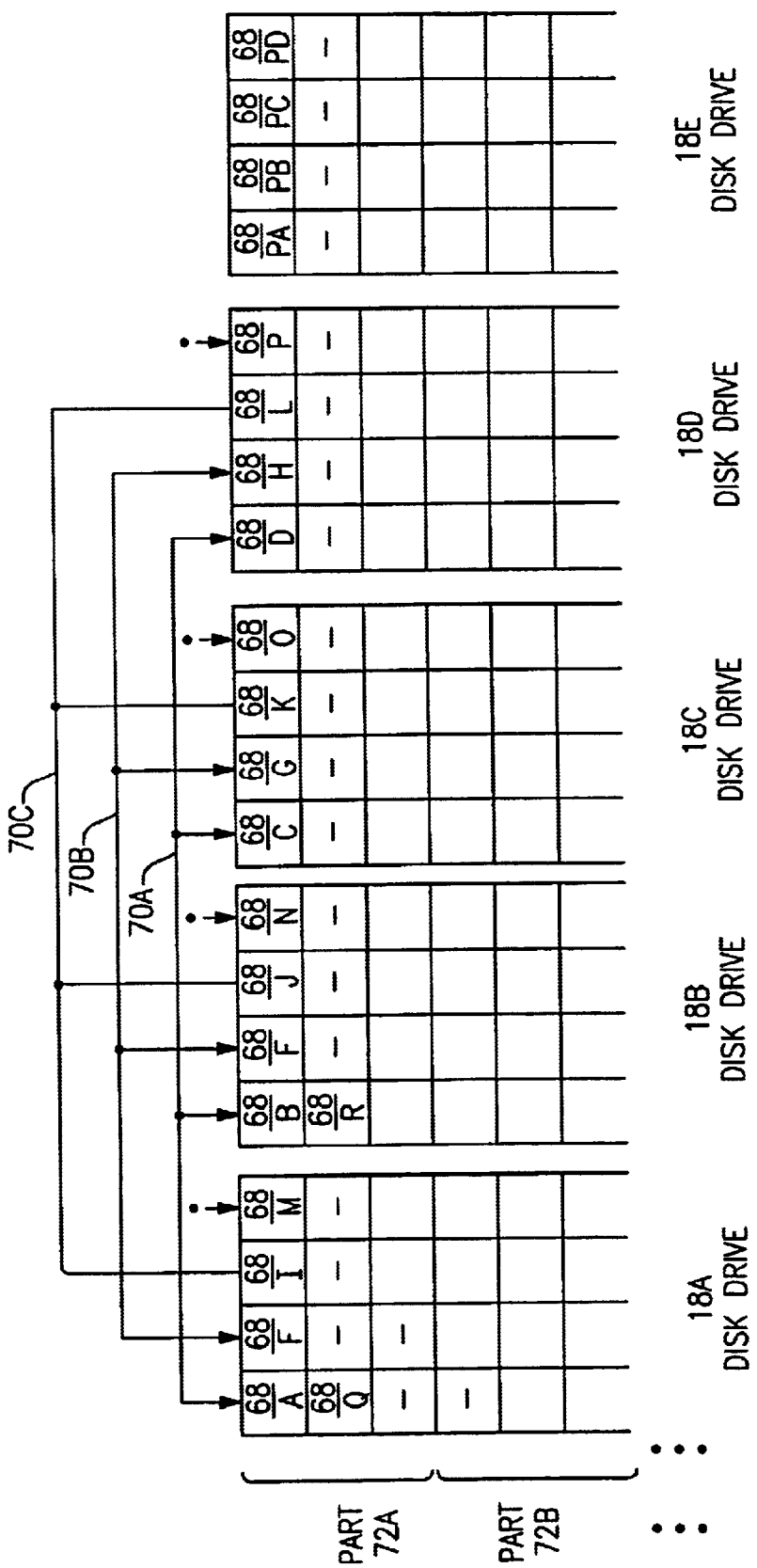
FIG. 4A is a diagrammatic representation of data storage topology in a mass storage system.

Referring to FIG. 4A, the present exemplary implementation of a Storage Sub-System 12 includes Disk Drives 18A, 18B, 18C, 18D and 16E wherein Disk Drives 18A through 18D are employed to store information, that is, various types of data, while Disk Drive 18E is used to store data recovery information relating to the data stored in Disk Drives 18A through 18D. The storage space on Disk Drives 18 is organized into segments of a selected size such as 512 bytes, 744 byes, 2048 byes, or 4098 bytes, and so on, which are generally but not necessarily of equal size, and data is stored on Disk Drives 18 in blocks, illustrated, for example, as Data Blocks (DBs) 68A through 68n, each of which may contain data or data recovery information relating to the data. Each DB 68 occupies a segment of the disk drive storage space and may contain a number of bytes of data up to the size of a segment of storage space and a given body of data, hereafter referred to as a data item, may be comprised of or occupy one or more DBs 68.

As illustrated in FIG. 4A, the segments of storage space in Disk Drives 18 and thus the storage of DBs 68 in Disk Drives 18 are organized and structured as "stripes" across Disk Drives 18. In "striping", DBs 68 are written into Disk Drives 18 with each sequential DB 68 being located on a different sequential one of Disk Drives 18, with the sequence of DBs 68 and Disk Drives 18 being repeated as necessary to store a given data item. Therefore, and as illustrated in the present example, DBs 68DA, 68DB, 68DC and 68DC may comprise a first Stripe 70A wherein DB 68A may be located on Disk Drive 18A, DB 68B on Disk Drive 18B, DB 68C on Disk 18C, and DB 68D on Disk Drive 18D. The sequences then repeat with DBs 68E, 68F, 68G and 68H comprising a Stripe 70B with DB 68E on Disk Drive 18A, DB 68F on Disk Drive 18B, DB 68G on Disk Drive 18C, DB 68H on Disk 18D, DB 68I on Disk Drive 18A, and so on. It will therefore be apparent that in the present exemplary embodiment of a mass storage system, the "length" of each Stripe 70 across Disk Drives 18, that is, the number of DBs 68 in each Stripe 70, will be equal to the number of Disk Drives 18 assigned and allocated to store data.

Therefore, if four Disk Drives 18D are allocated to store data and the fifth Disk Drive 18 is allocated to store data recovery information, each Stripe 70 across Disk Drives 18 would four DBs 68 long and the data recovery information would be organized as single Data Blocks 68P with each data recovery Data Block 68P containing data recovery information related to a corresponding Stripe 70 of four DBs 68. This is illustrated in FIG. 4A wherein Disk Drive 18E is shown as containing a data recovery DB 68PA containing data recovery information, such as parity information or error correcting code relating to Data Blocks 68A, 68B, 68C and 68D of Stripe 70A residing on, respectively, Disk Drives 18A, 18B, 18C and 18D, a data recovery DB 68PB containing data recovery information relating to Data Blocks 68E, 68F, 68G and 68H of Stripe 70B residing on, respectively, Disk Drives 18A, 18B, 18C and 18D, and so on.

In addition, and as will be discussed further in the following with respect to the present invention, the storage space available in Disk Drives 18 is organized into one more data partitions Data Partitions (PARTs) 72, wherein, and for example, a PART 72 may be comprised of one or multiple Disk Drives 18 or of a part of a Disk Drive 18. As will be described in the following, Storage Sub-System 12 operates such that each PART 72 is used as a logical storage device or area and each of PARTs 72 is separately addressable to operate as logical devices or storage areas for reading, writing and storing data.

Before proceeding with the description of the present invention, it must be noted, as will be understood by those of ordinary skill in the relevant arts, that a given data item may occupy a Stripe 70, a part of a Stripe 70, one or more Stripes 70, or one or more partial Stripes 70 or any combination thereof. Also, each sequential segment of storage space in a Stripe 70 need not actually contain data, that is, some of the DBs 68 illustrated in FIG. 4A may be "empty", as may occur, for example, as data is written into or erased from Disk Drives 18. It will also be understood that while it is common for the Disk Drives 18 of a mass storage system to be identical, that is, to have the same storage capacity, which generally facilitates the use of striping, it is not necessary that all of Disk Drives 18 be of identical capacity. In alternate embodiments, for example, the striping and allocation of PARTs 72 may be structured according to the storage capacities of the individual Disk Drives 18. That is, and for example, Disk Drives 18 having different storage capacities may be grouped and organized according to their storage capacities with each group being used as one or more striped PARTs 72.

As will be described below, the functions for managing and controlling the storage of data and data recovery information in Disk Drives 18 in the exemplary HAN File Server 10 include disk management and address translation mechanisms. These functions and mechanisms may, for example, be typically implemented in the operating system mechanisms executing in BEPs 44B of Blades 14A and 14B and in association with the RAID 46 functions. Certain of these functions and mechanisms, however, may be implemented in Storage Sub-System 12 depending, for example, upon the "intelligence" implemented in controllers of Disk Drives 18 or, for example, in processors and programs in Loop Controllers 26A and 26B. The general functions and structures of these functions and mechanisms are well known and well understood by those of ordinary skill in the relevant arts, as are the extensive variety of possible implementations of these functions and mechanisms in the various sub-systems of a HAN File Server 10 or other mass storage system. These functions and mechanisms and a specific implementation of these functions and mechanisms in a HAN File Server 10 or other mass storage system will therefore not be described in detail below, but will be discussed only as necessary and sufficient for those of ordinary skill in the arts to understand and implement the present invention.

As illustrated in FIG. 4B, the mass storage functions and mechanisms managing and controlling the allocation and topology of storage space in Disk Drives 18 and the storage of data and data recovery therein information typically include a System Disk Configuration Utility (SDCU) 74 which controls and manages the configuration and formatting of all Disk Drives 18 at system initialization and thereafter as necessary. The allocations of Disk Drives 18 for storing data and data recovery information and the assignment of Disk Drives 18 or portions of the storage spaces thereof to PARTs 72 are stored in a Disk Allocation Table (DAT) 74T. DAT 74T may also store other Disk Drive 18 related information used in managing the available storage space, such as the storage capacity of each Disk Drive 18 and the size or sizes of the data storage segments, that is, DBs 68, therein. The information residing in DAT 74T thereby defines the sizes of DBs 68, the allocation of the storage space in Disk Drives 18 among PARTs 72 and the physical starting address location and size, that is, number of DBs 68, of each Stripe 70 in PARTs 72. DAT 74T is typically read at first system initialization by SCDU 74, which directs the formatting and configuration each of Disks 18 according to its allocation. The disk allocation process may thereafter be repeated at a later time, for example, as system usage or data storage needs change, or to obtain the optimum allocation of Disk Drives 18.

As also illustrated in FIG. 4B, the mass storage functions and mechanisms further include a Demand Paging and Memory Management Facility (DPMM) 78. As is usual in such systems and as is well understood in the arts, DPPM 78 operates to relate and translate data read and write logical addresses generated by the application and operating systems programs into the corresponding physical addresses of the data in Disk Drives 18. The physical addresses provided by DPPM 78 will typically include an identification of the PART 72 and Disk Drive 18 in which the data resides. The physical addresses will also include information allowing the data to be located on the Disk Drives 18, such as the physical location in a Disk Drive 18 of the DB 68 containing the start of the referenced data and the number of DBs 68 occupied by the referenced data.

In this regard, and with regard to the present invention as described below, it must be noted that a body or item of data that is referenced in a read or write request may reside in one or more Stripes 70 or one or more partial Stripes 70 or any combination thereof and may reside, for example, in a single DB 68, in a contiguous group of DBs 68, in non-contiguous DBs 68 or in non-contiguous groups of DBs 68, or any combination thereof. There are a number of methods and mechanisms in common use in file systems to track, chain, link or otherwise relate and identify the physical locations on disks of the DBs 68 comprising a given file or body of data, any of which may be selected and implemented in the system of the present invention. As such methods and mechanisms are well known and understood by those of ordinary skill in the arts, these methods and mechanisms for tracking, chaining, linking or otherwise relating and identifying the physical locations on disks of the DBs 68 comprising a given file or body of data will not be discussed in further detail herein and it will be assumed that DPPM 78 embodies such a mechanism as necessary.

It should also be noted in this regard that the specific manner in which logical addresses are translated from the logical level to the detailed physical level, and the levels of translation performed at each step, depends upon the distribution of "intelligence" and functions among Blades 14, Storage Sub-System 12 and Disk Drives 18 in a particular system. As is well known and understood, a logical address may generally be expressed as a logical identification of a data file or other body of data, hereafter referred to generally as a "data item", plus an offset into the data item and a length of the data to be read or written. A physical address on a disk drive may, at the most detailed level, be generally expressed as a drive identification plus the identifications of the tracks, sectors and segments in which the data resides. In many systems there is little "intelligence" in the disk drives and the translation from a logical address to physical disk drive address is performed at a high level, for example, as part of operating system functions. In other systems, the disk drives are provided with a significant degree of "intelligence" and, for example, maintain tables relating the logical identifications of data items represented therein to the tracks, sectors and segments of the drive containing data blocks of the data files. As such, the system may access a given data file by providing to the disk drive an identifier of the drive and an identifier of the data item, whereupon the drive mechanism accesses its tables to identify the tracks, sectors and segments containing the data blocks of the data item and the data blocks are transferred into memory where specific data within the file may be accessed.

For purposes of illustration of a typical logical to physical address translation mechanism and of the present invention, however, it is assumed for purposes of the following description that Disk Drives 18 are provided with a sufficient degree of "intelligence" to relate a logical data item identification, such as a file name, offset into a file and length of data referenced, to the tracks, sectors and segments of the drive containing the Data Blocks 68 of the identified item. It is also assumed that Disk Drives 18 include sufficient "intelligence" to perform certain disk management functions, such as tracking the amount of storage capacity in use, freeing segments containing deleted DBs 68 and informing DPPM 78 whether there is sufficient remaining capacity to store a given data item.

As illustrated in FIG. 4B, DPPM 78 maintains an Address Translation Table (ATT) 80 storing the addressing information necessary to translate logical to physical addresses. It will be understood by those of ordinary skill in the arts that DPPM 78 may, for example, maintain translation lookaside buffers that operate as a cache mechanism to store the most frequently used or most recently used previously translated addresses, thereby avoiding the calculation operations necessary to translate a logical address to a physical address upon each reference. As will also be understood by those of ordinary skill in the arts, DPPM 78 will obtain the initial information necessary to construct ATT 80 and the address translation entries stored therein, which will be described below, from the information stored in DAT 74T, such as storage space topological information defining the sizes of DBs 68, the allocation of the storage space in Disk Drives 18 among Data Partition (Parts) 72 and the physical starting address location and size, that is, number of DBs 68, of each Stripe 70 in PARTs 72.

ATT 80 is represented in FIG. 4B as storing a Data Item Entry (DIE) 82 for each data item stored in Disk Drives 18 wherein a data item is comprised of one or more Data Blocks 68 that are related, for example, by containing related information or by being written into Disk Drives 18 as an entity or group. Each DIE 82 corresponds to a logical identification of a corresponding data item and includes one or more Data Address Translation Information (DATI) 84 blocks containing the information necessary for the logical to physical address translation of each read or write reference to a data item stored in Disk Drives 18, and possibly data recovery address translation information relating the corresponding logical to physical address translation information for the corresponding data recovery information. As represented in FIG. 4B, each DATI 84 may include a Data Partition Identifier (PartID) 86 identifying the PART 72 that the data item resides in, a Start 90S identifying the DB 68 at which the data item begins and Length Information (LI) 90L to identify the number of DBs 68 in the data item. Each DATI 84 may also include, from DAT 74T, may include a Disk Drive Identification (DDI) 88 identifying the particular Disk Drive 18 that at least the first DB 68 of the data item resides in. As described above, DPPM 78 will include the mechanisms necessary to tracking, chaining, linking or otherwise relating and identifying the physical locations on disks of the DBs 68 comprising a given file or body of data, even if the DBs 68 comprising the file or body of data are not contiguously located in Disk Drives 18. Depending upon the method used, and as will understood by those of ordinary skill in the relevant arts, this information may reside in the DBs 68 or in the DATI 84 blocks of each DIE 82, and need not be discussed further herein. Lastly with respect to ATT 80, it should be noted that information described herein above as stored in either DAT 74T and in ATT 80 may be stored in a single, unified ATT 80, rather than between DAT 74T and ATT 80.

Next considering the physical addresses generated by DPPM 78, and depending upon the degree of intelligence in Disk Drives 18, each Physical Address 92 may include a Data Item Identification (DII) 94, a Disk Drive Identification (DDI) 96, an identification of a Data Partition Identification (PartID) 98 and a Data Block Identification (DBI) 100. DPPM 78 will therefore access a data item containing a plurality of DBs 68 by generating a sequence of Physical Addresses 92, one for each DB 68 in the data item identified by the logical address, starting with the first DB 68 of the data item and proceeding sequentially through the DBs 68 for the identified length of the data item. It will be understood by those of ordinary skill in the relevant arts that the form and contents Physical Addresses 92 and the generation of Physical Addresses 92 to locate the DBs 68 of a data item will depend upon, for example, the capabilities and operation of Disk Drives 18 and the scheme by which DBs 68 are stored on Disk Drives 18. That is, in some implementations Disk Drives 18 may be provided with a DII 94 and a data item length, that is, number of DBs 68, and will sequentially locate and access the successive DBs 68 of the identified data item. In other embodiments of Disk Drives 18, it may be necessary to generate a Physical Address 92 for each DB 68 and to issue a sequence of read or write commands. The requirement for and the form and content of Physical Addresses 92 will also depend upon the scheme by which the DBs 68 are stored on the Disk Drives 18, that is, the method and pattern of striping and whether the DBs 68 of a given data item are always stored contiguously or may be stored non-contiguously. In addition, the identity and physical locations of the DBs 68 comprising a data item can also be identified and determined in a number of alternate ways that will be known and understood by those of ordinary skill in the relevant arts. For example, the logical to physical address translation described just above assumes a sufficient degree of "intelligence" in each Disk Drive 18 to identify the track and sector locations in a Disk Drive 18 of the DBs 68 of an identified data item. In other systems, the DATIs 84 may also include, for example, the track, sector and segment identifications for the Disk Drives 18 in which the Data Block (DBs) 68 reside, or information for generating the track, sector and segment identifications, as will the Physical Addresses 92. Again, the generation of physical addresses for such systems is well known and understood by those of ordinary skill in the relevant arts and will not therefore be discussed in detail.

Now considering the present invention in detail, it has been described above that, according to the present invention, the storage space available in Disk Drives 18 is organized into one more data partitions PARTs 72, wherein, and for example, a PART 72 may be comprised of one or multiple Disk Drives 18 or of a part of a Disk Drive 18. Each PART 72 is used as a logical storage device or area and each of PARTs 72 is separately identifiable and addressable to operate as logical devices or storage areas for reading, writing and storing data. This structuring and organization of the storage space in Disk Drives 18 is represented in FIG. 4A, wherein the storage space of Disk Drives 18 is represented as partitioned or allocated into a plurality of PARTs 72, represented as PARTs 72A, 72B, and so on through PART 72n and wherein the physical storage areas within each PART 72 is structured as one or more Stripes 70.

According to the present invention, each of PARTs 72 is allocated and assigned to and corresponds to a different type or category of information to be stored in Disk Drives 18 wherein the classification of data into categories or types is on a twofold basis. That is, a body of information, or "data item", to be written into Disk Drives 18 data is classified, in one aspect, according to the type of information represented by the data item. One type or category of information or data may be referred to as "general" data and includes data having essentially unstructured characteristis, such as variable data item sizes and variable read/write access requirements, and may include, for example, text file data, image data, program code, and so on. Other types or categories of information or data may be referred to as "structured" data and may include information having specific, structured data characteristics, such as uniform data item sizes, defined read/write access requirements or storage characteristics, or defined relationships among data items containing that type of data or with data items of other types, or other defined and structured characteristics. Examples of such "structured" types of information may include, for example, indirect blocks or inodes or structured databases.

As least certain types or categories of data items, and in particular "general" data items, are further classified topologically, that is, whether a body of data to be written into Disk Drives 18 is "full stripe" data, that is, will occupy one or more full stripes of storage space, that is, DBs 68, in a corresponding PART 72, or "partial-stripe" data, that is, will not occupy a full Stripe 70 of storage space in the PART 72.

In general, therefore, the categorization of data items to be written into Disk Drives 18 is, in one aspect, according to the characteristics of the data itself, that is, the size, formats and read/write access requirements of the data, and may be referred to as "data characteristic" classification. The categorization of data items to be written into Disk Drives 18 is, in a second aspect, according to the topological relationship between the data item and the storage topology of Disk Drives 18 and may be referred to as "topological" classification. It should also be noted, however, that two or more types of data may be categorized as belonging to the same type or classification if, for example, the optimum storage space requirements and read/write access requirements of the types of data are sufficiently similar.

According to the present invention, a Topological Data Formatter 102 of the present invention provides a method and apparatus for ordering and storing the data of data items to be written into a mass storage in accordance with the topology of the mass storage space to optimally conform with the storage processes of the mass storage system. In the present exemplary implementation, and for example, the mass storage system is embodied in Storage Sub-System 12, which is topologically structured as a striped, RAID 5 mass storage system.

As illustrated in FIG. 4B, Topological Data Formatter 102 is connected between, for example, JFile 50 and RAIDF 46F, includes a Write Data Buffer (WBuff) 104 and a Data Classifier (DClass) 106 wherein WBuff 104 may, for example, be implemented in the Memory 38A of each Blade 14 and DClass 106 may, for example, be implemented in the BEP 44B of each Blade 14 and in association with the RAID 46 functions therein.

As illustrated in FIG. 4B, DClass 106 and WBuff 104 in conjunction with DPPM 78 to classify and buffer data to be written into Disk Drives 18. As described below, DClass 106 and WBuff 104 operate to organize or structure data to be written into Disk Drives 18 optimally with respect to the storage space topology of Disk Drives 18 and the disk processing methods or algorithms of the selected RAID methodology implemented therein. In this regard, and as illustrated in FIG. 4B, WBuff 104 is partitioned into a plurality of Type Buffers (TBuffs) 108A through 108n wherein each TBuff 108 corresponds to a PART 72, and thus to a type or category of data, and each TBuff 108 is used to store a corresponding type of data before that data is written into Disk Drives 18.

Data Items 110 containing data to be written into Disk Drives 18 are received into DClass 106 from, for example, JFile 50. As represented in FIG. 4B, each Write Data Item 110 may typically contain a Data Item Identification (DII) 94 identifying the file or other form of data structure into which the data is to be written, the Data 110D to be written into Disk Drives 18, and a Location 110L identifying the location within the file or other data structure at which the Data 110D is to be written, such as an offset from the start of the file or other data structure. A Write Data Item 110 may also include a Size Identifier (SID) 110S identifying the amount of data to be written in the Data Item 100 and may include a Type Identifier (TID) 110T identifying the type of data.

DClass 106 includes a Initial Classifier (IClass) 112 that performs an initial classification of each Write Data Item 110 according to the type of information represented by the Data Item 112. That is, and for example, IClass 112 will determine whether a given Data Item 112 is of a type that is to be topologically classified, such as a Write Data Item 110 containing "general" data, or is a member of one or more categories of "structured" data recognized by Topological Data Formatter 102, such as indirect blocks or inodes. As will be understood by those of ordinary skill in the relevant arts, this classification may be accomplished by reading the Type Identifier (TID) 110T of the Write Data Item 110, if present, or may be determined from, for example, the Data Item Identification (DII) 94, or, in further example, from a file extension.

In the instance of those types or categories of data for which DClass 106 performs only a "data type" categorization, which will typically include "structured" data types, such as indirect blocks or inodes, DClass 106 will write the Data Items 110 directly into the corresponding "structured data type" TBuffs 108. Each such type of Write Data Item 110 will be accumulated in its corresponding TBuff 108 and, as DClass 106 writes each Write Data Item 110 into a TBuff 108, DClass 106 will sort and group the Data Items 110 to form ordered groups of contiguously related Data Items 110 if the characteristics of the data type are such as to form contiguously related bodies of data.

Subsequently, at the next time that the buffered data in WBuff 104 is to be written into Disk Drives 18, the Data 10D contents of each "structured" TBuff 108 are read from the TBuffs 108 and are ordered into one or more "full-stripe" Data Block Groups (DBGs) 114 wherein each DBG 114 contains one or more DBs 68 of "structured" Data 110D. The "full-stripe" DBGs 114 forming are written contiguously into the corresponding "structured" PARTs 72 in one or more full Stripe 70 writes, with the Data 110D contents preferably being sequentially ordered in the writes if such ordering is advantageous of possible within the characteristics of the data.

It must be noted that amount of data accumulated in a "structured" TBuff 108 at the time of a write to Disk Drives 18 or the ordering relationships between the Data 110D contents of the Data Items 110 therein may result in one or more "partial-stripe" DBGs 114 wherein the number of DBs 68 in a "partial-stripe" DBG 114 comprises a partial Stripe 70. In such instances, and depending upon the implementation chosen, the Data Items 110 of "partial-stripe" DBGs 114 may be retained in the TBuff 108 pending subsequent accumulation of Data Items 110 of that type and the possible formation of full Stripes 70 at a subsequent write to Disk Drives 18, may be written into the PART 72 as a partial Stripe 70, or may be written into the PART 72 as one or more full Stripes 70 wherein some of the DBs 68 of the Stripes 70 are "blank", that is, contain no Data 110D.

As a consequence of the operation just described, certain types of data that would normally be written into Disk Drives 18 in partial Stripe 10 writes, thus requiring the execution of one or more read-modify-write operations by Disk Drives 18, such as indirect blocks and inodes, are executed as full Stripe 70 writes, thereby significantly enhancing the data transfer rates for writes of such data to Disk Drives 18. In addition, a subsequent write that would modify data residing in a Stripe 70 of a PART 72 may be executed as a full Stripe 70 read-modify-write, rather than as a partial read-modify-write, thereby further enhancing the speed of operation of the system for such operations.

As described above, other types or categories of information or data, and in particular information that may be referred to as "general" data and may include, for example, text file data, image data, program code, and so on, are characterized as having widely variable data item sizes and variable read/write access requirements. As described, such types of data, and possibly certain types or categories of "structured" data, are classified or categorized "topologically" as "general" data types, that is, according to the topological relationship between the data items and the storage topology of Disk Drives 18, in particular, the striping pattern implemented in Disk Drives 18.

According to the present invention, and as indicated in FIG. 4B, IClass 112 identifies and classifies such Data Items 110 as containing data of a type or types, such as "general" data, that is to be topologically classified or categorized, and transfers such Data Items 110 to a Topological Classifier (TClass) 116. TClass 116, in turn, identifies from the Write Data Item 110 the Data Item Identification (DII) 94 of the file or other data structure into which the Data 110D is to be written, the starting location within the file or data structure at which the Data 110D is to be written, and the size, that is, number of DBs 68, of the Data 110D that is to be written. From the information in ATT 80 for that Write Data Item 110, TClass 116 determines the DDI 88 and PartID 86 identifying the particular Disk Drive 18 and PART 72 that the first DB 68 of the data item resides in, a Start 90S identifying the DB 68 at which the data item begins and Length Information (LI) 90L to identify the number of DBs 68 in the data item. It will be understood that this information from ATT 80 may also include, for example, linking or chaining information, if such information is necessary to locate the relevant DBs 68 of the data item in Disk Drives 18. Finally, TClass 116 may also access DAT 74T to obtain relevant striping pattern information, such as the number DBs 68 in each Stripe 70 of the appropriate PART 72 and the size of the DBs 68.

TClass 116 will determine, for each Write Data Item 110 that is to be topologically categorized, the topological relationship of the Data 110D and the topological organization of storage space in the Disk Drives 18. That is, TClass 116 will compare the starting point in Disk Drives 18 and size of the file or data structure identified by the corresponding DII 94, the location at which the Data 110D is to be written, the size of the Data 10D, the size and number of DBs 68 in a Stripe 70 and starting points of Stripes 70 in a PART 72, to determine the alignment of the Data 110D with the striping pattern. From this comparison, TClass 116 will determine an initial classification or categorization of a Write Data Item 110 as representing "full stripe" data or "partial-stripe" data, that is, whether the Data 110D contains one or more full Stripes 70 of data, with a starting point falling on the starting boundary of a Stripe 70, or contains one or more partial Stripes 70 of data or has a starting point not falling on the starting boundary of a Stripe 70.

DClass 106 will write each topologically categorized Write Data Item 110 into a corresponding TBuff 108 wherein, according to the present invention, Write Data Items 110 may be categorized as "full-stripe" data items or as "partial-stripe" data items. As such, WBuff 108 will includes a "full-stripe" TBuff 108 and a "partial-stripe" TBuff 108 and PARTs 72 will include a "full-stripe" PART 72 and a "partial-stripe" PART 72 and DClass 106 will write each topologically categorized Write Data Item 110 into its corresponding TBuff 108 as the Write Data Items 100 are categorized. It should also be noted that, in certain implementations of Topological Data Formatter 102, and as DClass 106 writes each Write Data Item 110 into the "partial-stripe" TBuff 108, DClass 106 may sort and group the Write Data Items 110 to form ordered groups of contiguously related Write Data Items 110 if the Write Data Items 110 should occur as to form contiguously related bodies of data. As described below, certain groups of such accumulate "partial-stripe" Write Data Items 110 may combine to form "full-stripe" Write Data Items 100.

At the next time that the buffered data in WBuff 104 is to be written into Disk Drives 18, DClass 106 will read the Write Data Items 110 from the "full-stripe" and "partial-stripe" TBuffs 108 and TClass 116 will re-execute the categorization of each Write Data Item 110 residing therein. If the initial categorization of a Write Data Item 110 as a "full-stripe" Write Data Item 110 is found to be correct, DClass 106 will order the Data 110D of the Write Data Item 110 into one or more DBGs 114 with other such Datas 110D. DClass 106 will then write the DBGs 114 containing "full-stripe" Datas 110D into the "full-stripe" PART 72. As a consequence, each Write Data Item 110 that has been confirmed as correctly categorized as "full-stripe" Write Data Items 110 will be written to the appropriate location in the "full-stripe" PART 72 one or more full stripe writes, thereby avoiding the usual read-modify-write operation and significantly enhancing the data transfer rate.

If the initial categorization of a Write Data Item 110 as a "full-stripe" Write Data Item 110 is found to be incorrect, for example, as a result of previous writes of topologically related Write Data Items 110 to Disk Drives 18, DClass 106 will re-categorize the Write Data Item 110 as a "partial-stripe" data item. DClass 106 may then re-write the re-categorized "partial-stripe" Write Data Items 110 back into the "partial-stripe" TBuff 108 for re-examination and possible combination with other accumulated "partial-stripe" Write Data Items 110 into one or more "full-stripe" Write Data Items 110, to be subsequently treated as described below. Alternately, DClass 106 may write the re-categorized "partial-stripe" Write Data Items 110 to the appropriate location in the "partial-stripe" PART 72 in Disk Drives 18 in one or more "partial-stripe" DBGs 114. DClass 108 may also re-write the re-categorized "partial-stripe" Write Data Items 110 to the "partial-stripe" TBuff 108 to be held for a subsequent re-evaluation and possible combination with other "partial-stripe" Write Data Items 110 into "full-stripe" Write Data Items 110 during a subsequent write to Disk Drives 18 by DClass 106.

In a like manner, if the initial categorization of a Write Data Item 110 as a "partial-stripe" Write Data Item 110 is found to be correct, DClass 106 may write the "partial-stripe" Write Data Item 110 into one or more "partial-stripe" DBGs 114 with similar "partial-stripe" Datas 110D and will write the "partial-stripe" DBGs 114 into the "partial-stripe" PART 72, executing a read-modify-write operation if necessary. Alternately, DClass 106 may re-write the confirmed "partial-stripe" Write Data Items 110 to the "partial-stripe" TBuff 108 to be held for a subsequent re-evaluation and possible combination with other "partial-stripe" Write Data Items 110 into "full-stripe" Write Data Items 110 during a subsequent write to Disk Drives 18 by DClass 106.

Finally, if the initial categorization of a Write Data Item 110 as a "partial-stripe" Write Data Item 110 is found to be incorrect, for example, as a result of previous writes of topologically related Write Data Items 110 to Disk Drives 18 or the combination or occurrence of two or more "partial-stripe" Write Data Items 110 to form a "full-stripe" Write Data Item 110, DClass 106 will re-categorize the Write Data Item 110 as a "full-stripe" data item. DClass 106 will then write the re-categorized Write Data Item 110 to the appropriate location in the "full-stripe" PART 72 one or more full stripe writes of "full-stripe" DBGs 114.

Lastly in this regard, it should be noted that the RAID 46 functions and mass storage functions and mechanisms of Storage Sub-System 12 and that are associated with Topological Data Formatter 102 will include a data recovery information mechanism, such as a parity or error correcting code generator, which is not shown explicitly as well known to those of ordinary skill in the relevant arts. The parity or error correction code generator will generate parity or error correction code data blocks as appropriate for the implemented RAID technology for each write to Disk Drives 18, and the parity or error correcting code information will be written into the appropriate DBs 68 of the Stripes 70.

In summary, therefore, the present invention provides a method and apparatus for ordering and storing the data of data items to be written into a mass storage in accordance with the topology of the mass storage space to optimally conform with the storage processes of the mass storage system. In particular, a Topological Data Formatter 102 categorizes and groups all data items to be written to Disk Drives 18 in a first aspect according to their data types and in a second aspect according to their topological relationship with the storage areas of Disk Drives 18 for the particular RAID technology implemented in the mass storage system to achieve groupings of data items wherein the groupings are optimized for the topology of the storage areas and the storage operations performed by the RAID technology. As a consequence, the data item write operations are optimized for the mass storage topology and RAID operations to accord, so far as is possible, with the most efficient mass storage write operations, thereby significantly enhancing the data transfer rate to mass storage for mass storage write operations.

It will be apparent to those of ordinary skill in the relevant arts that the present invention may be implemented for any form of shared resource requiring the preservation and recovery of data or operational transactions, such as a communications server, various types of data processor servers, print servers, and so on, as well as the file server used as an example herein. It will also be apparent that the present invention may be likewise adapted and implemented for other implementations of file servers using, for example, different RAID technologies, different storage technologies, different communications technologies and other information processing methods and techniques, such as image processing. The adaptation of the present invention to different forms of shared resources, different resource managers, different system configurations and architectures, and different protocols will be apparent to those of ordinary skill in the relevant arts.

It will therefore be apparent to those of ordinary skill in the relevant arts that while the invention has been particularly shown and described herein with reference to preferred embodiments of the apparatus and methods thereof, various changes, variations and modifications in form, details and implementation may be made therein without departing from the spirit and scope of the invention as defined by the appended claims, certain of which have been described herein above. It is therefore the object of the appended claims to cover all such variation and modifications of the invention as come within the true spirit and scope of the invention.

What is claimed is:

1. In a mass storage system including a mass storage space for storing data items of a plurality of data types, each data item containing data of a corresponding data type and each data type being defined by the characteristics of the information represented by the data, and wherein the storage space is topologically organized as a plurality of basic units of storage space wherein each basic unit of storage space contains storage space for a predetermined number of data blocks of predetermined sizes, a method for storing the data in the storage space, comprising the steps of:
   categorizing each data item to be written into the storage space as a member of a data type, including
      performing an initial categorization of each data item to identify whether a data item is a member of one of a plurality of one or more structured data types, having defined data characteristics or a least one general data type having variable data characteristics, and
      writing each data item that is a member of the one or more structured data types into a corresponding type buffer, and
   performing a topological categorization of each data item that is a member of at least one general data type and identifying whether each data item that is a member of at least one general data type is
      a full-basic unit data type wherein the data of the data items form one or more data block groups wherein each data block group conforms to the basic unit of storage space, or
      a partial-basic unit data type wherein the data of the data items form one or more data block groups wherein each data block group differs from the basic unit of storage space, and
      writing each data item that is a full-basic unit data type into a full-basic type buffer, and
      writing each data item that is a partial-basic unit data type into a partial-basic type buffer,
   upon performing a write of the data items to the mass storage,
      reading each data item from the corresponding type buffer, and
         for each data item of a structured data type, ordering the data of the data items into one or more data block groups wherein each data block group corresponds to a basic unit of storage, and
         writing the one or more data block groups of each structured data type into a corresponding data type area of the storage space,
         for each data item of the full-basic unit type and of the partial-basic unit type,
            re-executing the topological classification of each data item and re-categorizing each data item as a full-basic unit data type or as a partial-basic unit data type, and
            ordering the data of each data item of a full-basic unit data type and the data of each data item of a partial-basic unit data type into one or more corresponding full-basic unit data block groups or one or more corresponding partial-basic unit data block groups wherein each data block group corresponds to a basic unit of storage, and
            writing the full-basic unit data block groups and the partial-basic unit data block groups into corresponding data type areas of the storage space.

2. The method of claim 1 for storing data in a storage space, further comprising the step of:
   upon writing each data item into a corresponding type buffer, and when the data of a data item being written into a type buffer and the data of one or more data items residing in the type buffer form a full-basic unit of storage space, combining the data items forming a full-basic unit of storage space.

3. The method of claim 1 for storing data in a storage space, further comprising the step of:
   returning all data items forming partial-basic unit data block groups to the corresponding type buffers for re-ordering into full-basic unit data block groups in a subsequent write to the storage space.

4. The method of claim 1 for storing data in a storage space, wherein:
   each basic unit of storage space is a stripe of a striped mass storage system and wherein each stripe contains storage space for a predetermined number of data blocks.

5. The method of claim 4 for storing data in a storage space, wherein:

the mass storage system is a RAID technology storage system and wherein each stripe further includes at least one data block for storing data recovery information.

6. The method of claim 1 for storing data in a storage space, wherein:

the mass storage space is structured into a plurality of data partitions wherein each data partition corresponds to a data type and is used to store data of the corresponding data type.

7. In a mass storage system including a mass storage space for storing data items of a plurality of data types, each data item containing data of a corresponding data type and each data type being defined by the characteristics of the information represented by the data, and wherein the storage space is topologically organized as a plurality of basic units of storage space wherein each basic unit of storage space contains storage space for a predetermined number of data blocks of predetermined sizes, a topological data formatter for storing the data in the storage space, comprising:

a write data buffer corresponding to each data type;

an initial data classifier for
data type categorizing of each data item to be written into the storage space as a member of a data type, including
performing an initial categorization of each data item to identify whether a data item is a member of a structured data type having defined data characteristics or a general data type having variable data characteristics, and
writing each data item that is a member of a structured data types into a corresponding type buffer, and a topological data classifier for
topological categorizing of each data item that is a member of a general data type and identifying whether each data item that is
a member of a general data type is a full-basic unit data type wherein the data of the data items form one or more data block groups conforming to the basic unit of storage space or
a partial-basic unit data type wherein the data of the data items form one or more data block groups differing from the basic unit of storage space,
writing each data item that is a full-basic unit data type into a full-basic type buffer, and
writing each data item that is a partial-basic unit data type into a partial-basic type buffer, wherein upon performing a write of the data items to the mass storage,
the initial data classifier reads each data item from the corresponding type buffer and,
for each data item of a structured data type, orders the data of the data items into one or more data block groups wherein each data block group corresponds to a basic unit of storage and writes the one or more data block groups of each structured data type into a corresponding data type area of the storage space, and
for each data item of the full-basic unit type and of the partial-basic unit type, the topological data classifier re-executes the topological classification of each data item as a full-basic unit data type or as a partial-basic unit data type,
orders the data of each data item of a full-basic unit data type and the data of each data item of a partial-basic unit data type into one or more corresponding full-basic unit data block groups or one or more corresponding partial-basic unit data block groups, and
writes the full-basic unit data block groups and the partial-basic unit data block groups into corresponding data type areas of the storage space.

8. The topological data formatter of claim 7 wherein:

upon writing each data item into a corresponding type buffer, the topological data formatter combines the data of a data item being written into a type buffer and the data of one or more data items residing in the type buffer to form a full-basic unit of storage space.

9. The topological data formatter of claim 7, wherein:

upon performing a write of the data items to the mass storage, the topological data formatter returns all data items forming partial-basic unit data block groups to the corresponding type buffers for re-ordering into full-basic unit data block groups in a subsequent write to the storage space.

10. The topological data formatter of claim 7, wherein:

each basic unit of storage space is a stripe of a striped mass storage system and each stripe contains storage space for a predetermined number of data blocks.

11. The topological data formatter of claim 10, wherein:

the mass storage system is a RAID technology storage system and each stripe further includes at least one data block for storing data recovery information.

12. The topological data formatter of claim 7, wherein:

the mass storage space is structured into a plurality of data partitions wherein each data partition corresponds to a data type and is used to store data of the corresponding data type.

13. A topological data formatter for writing data blocks of data items of a plurality of data types into a storage space of a mass storage system topologically organized as basic units of storage space, comprising:

a write data buffer for each data type, an initial data classifier for
initially categorizing each data item as a structured data type having defined data characteristics or a general data type having variable data characteristics and
writing each structured data type data item into a corresponding type buffer, and ordering the structured data type data items into data block groups corresponding to a basic storage units and writing the data block groups into corresponding areas of storage space, and a topological data classifier for
topologically categorizing each general data type data item as a full-basic unit data type forming data blocks or as a partial-basic unit data type and
writing each general data type data item into a corresponding full-basic type buffer or partial-basic type buffer, and
re-executing the topological classification of buffered full-basic and partial-basic unit data type data items,
ordering the data items into full-basic or partial-basic unit data block groups, and
writing the data block groups into corresponding areas of storage space.

14. A method for topologically formatting and writing data blocks of data items of a plurality of data types into a storage space of a mass storage system topologically organized as basic units of storage space, comprising the steps of:

categorizing each data item as a structured data type having defined data characteristics or a general data type having variable data characteristics and writing each structured data type data item into a corresponding type buffer, topologically categorizing each general data type data item as a full-basic unit data type forming data blocks or as a partial-basic unit data type and writing each general data type data item into a corresponding full-basic type or partial-basic type buffer, re-executing the topological classification of buffered full-basic and partial-basic unit data type data items, ordering the buffered data items into data block groups, and writing the data block groups into areas of storage space corresponding to the data types of the data items.

* * * * *